(12) United States Patent
Lee et al.

(10) Patent No.: US 12,730,351 B2
(45) Date of Patent: Sep. 8, 2026

(54) OPTICAL PATH CONTROL MEMBER AND DISPLAY DEVICE COMPRISING SAME

(71) Applicant: LG INNOTEK CO., LTD., Seoul (KR)

(72) Inventors: Gyu Lin Lee, Seoul (KR); Byung Sook Kim, Seoul (KR); Seung Jin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 215 days.

(21) Appl. No.: 18/730,378

(22) PCT Filed: Jan. 2, 2023

(86) PCT No.: PCT/KR2023/000050
§ 371 (c)(1),
(2) Date: Jul. 19, 2024

(87) PCT Pub. No.: WO2023/140533
PCT Pub. Date: Jul. 27, 2023

(65) Prior Publication Data

US 2025/0123535 A1 Apr. 17, 2025

(30) Foreign Application Priority Data

Jan. 19, 2022 (KR) ........................ 10-2022-0008083

(51) Int. Cl.
*G02F 1/29* (2006.01)
*G02F 1/1335* (2006.01)
(Continued)

(52) U.S. Cl.
CPC .............. *G02F 1/29* (2013.01); *G02F 1/1335* (2013.01); *G02F 1/136209* (2013.01); *G02F 1/136222* (2021.01); *G02F 1/1368* (2013.01)

(58) Field of Classification Search
None
See application file for complete search history.

(56) References Cited

U.S. PATENT DOCUMENTS 11,281,066 B2 3/2022 Shiota et al.
11,619,854 B2 4/2023 Yoon et al.
(Continued)

FOREIGN PATENT DOCUMENTS

JP 2020-67655 A 4/2020
KR 10-2018-0004879 A 1/2018
(Continued)

OTHER PUBLICATIONS

International Search Report dated Mar. 30, 2023 in International Application No. PCT/KR2023/000050.

*Primary Examiner* — Ryan Crockett
(74) *Attorney, Agent, or Firm* — SALIWANCHIK, LLOYD & EISENSCHENK

(57) ABSTRACT

An optical path control member according to an embodiment includes a first substrate; a first electrode disposed on the first substrate; a second substrate disposed on the first substrate; a second electrode disposed under the second substrate; and a light conversion part disposed between the first electrode and the second electrode and including a receiving part in which a light conversion material is disposed, wherein at least one of the first electrode and the second electrode includes a plurality of pattern electrodes, wherein the pattern electrodes extend in a direction different from a longitudinal direction of the receiving part, wherein the pattern electrodes are disposed to be spaced apart from each other between a first end and a second end of the receiving part in the longitudinal direction, wherein the pattern electrode includes a first pattern electrode disposed adjacent to the first end and a second pattern electrode disposed farther from the first end than the first pattern electrode, and wherein voltages having different polarities are applied to the first pattern electrode and the second pattern electrode.

20 Claims, 15 Drawing Sheets

(51) Int. Cl.

| | |
|---|---|
| ***G02F 1/1362*** | (2006.01) |
| ***G02F 1/1368*** | (2006.01) |

(56) References Cited

U.S. PATENT DOCUMENTS

| | | | | |
|---|---|---|---|---|
| 12,372,845 | B2 * | 7/2025 | Shin | G02F 1/157 |
| 2009/0308750 | A1 * | 12/2009 | Jang | B01D 57/02<br>204/600 |
| 2019/0101806 | A1 * | 4/2019 | Takaya | G02F 1/16761 |
| 2020/0033689 | A1 * | 1/2020 | Lee | G02F 1/1368 |
| 2020/0124936 | A1 * | 4/2020 | Shiota | G02F 1/16756 |
| 2022/0260883 | A1 | 8/2022 | Shin et al. | |
| 2022/0397801 | A1 * | 12/2022 | Park | G02B 26/08 |
| 2023/0176441 | A1 * | 6/2023 | Kim | G02F 1/167<br>359/265 |
| 2023/0205029 | A1 * | 6/2023 | Song | G02F 1/137 |
| 2023/0205041 | A1 * | 6/2023 | Lee | G02F 1/172<br>359/296 |
| 2024/0201528 | A1 * | 6/2024 | Kim | G02B 5/3033 |

FOREIGN PATENT DOCUMENTS

| | | | |
|---|---|---|---|
| KR | 10-1971874 | B1 | 4/2019 |
| KR | 10-2019-0050722 | A | 5/2019 |
| WO | 2021/020802 | A1 | 2/2021 |
| WO | 2021/066368 | A1 | 4/2021 |

* cited by examiner 530
540
120
220
420
350
300
410
210
110
330a
330b
330
310
320 h
210, 220
110, 120
500
h
320

LIGHT 110
210
410
300
420
220
120
310
320
330b 330a
330

SHARE MODE

OPTICAL PATH CONTROL MEMBER AND DISPLAY DEVICE COMPRISING SAME

CROSS-REFERENCE TO RELATED APPLICATIONS

This application is the U.S. national stage application of International Patent Application No. PCT/KR2023/000050, filed Jan. 2, 2023, which claims the benefit under 35 U.S.C. § 119 of Korean Application No. 10-2022-0008083, filed Jan. 19, 2022, the disclosures of each of which are incorporated herein by reference in their entirety.

TECHNICAL FIELD

An embodiment relates to an optical path control member and a display device including the same.

BACKGROUND ART

A light blocking film is a film that blocks light from being transmitted from a light source. The light blocking film is attached to a front of a display panel, which is a display device used for a mobile phone, laptop, tablet PC, vehicle navigation, or vehicle touch screen. The light blocking film adjusts a viewing angle of light according to an angle of incidence of light when the display outputs a screen. As a result, the user can view clear image quality at the desired viewing angle.

In addition, light blocking film is used for windows in vehicles or buildings. In detail, the light blocking film can inhibit glare by partially shielding external light. Alternatively, the light blocking film can make an inside invisible from an outside.

That is, the light blocking film controls a movement path of light. As a result, the light blocking film can block light at an angle within a set range and transmit light at an angle within a set range. Accordingly, a transmission angle of light is controlled by the light blocking film.

The light blocking film can be divided into a light blocking film that can always control the viewing angle regardless of the surrounding environment, and a switchable light blocking film that allows the user to turn the viewing angle control on and off depending on the surrounding environment.

The switchable light blocking film includes a light conversion part including a receiving part. The receiving part is filled with a light conversion material including particles and a dispersion liquid for dispersing the particles. The particles can move by application of voltage. The receiving part may be converted into a light transmitting part and a light blocking part by dispersion and aggregation of the particles.

In detail, the particles repeatedly move in a height direction of the receiving part by application of voltage. Thereby, the receiving part can be converted into a light transmitting part or a light blocking part.

Meanwhile, the switchable light blocking film is used by being attached to the screen of a display. Therefore, gravity can be transmitted in a longitudinal direction of the receiving part during operation. Accordingly, particles disposed in the receiving part can precipitate in a gravity direction. Therefore, when the receiving part is driven as a light blocking part, a light transmittance may vary depending on a position of the receiving part. As a result, driving characteristics of the switchable light blocking film may be reduced.

Accordingly, an optical path control member with a new structure that can solve the above problems is required.

DISCLOSURE

Technical Problem

An embodiment is to provide an optical path control member capable of inhibiting precipitation of light conversion particles.

The embodiment is to provide an optical path control member having improved driving characteristics.

Technical Solution

An optical path control member according to an embodiment includes a first substrate; a first electrode disposed on the first substrate; a second substrate disposed on the first substrate; a second electrode disposed under the second substrate; and a light conversion part disposed between the first electrode and the second electrode and including a receiving part in which a light conversion material is disposed, wherein at least one of the first electrode and the second electrode includes a plurality of pattern electrodes, wherein the pattern electrodes extend in a direction different from a longitudinal direction of the receiving part, wherein the pattern electrodes are disposed to be spaced apart from each other between a first end and a second end of the receiving part in the longitudinal direction, wherein the pattern electrode includes a first pattern electrode disposed adjacent to the first end and a second pattern electrode disposed farther from the first end than the first pattern electrode, and wherein voltages having different polarities are applied to the first pattern electrode and the second pattern electrode.

Advantageous Effects

The optical path control member according to the embodiment includes a pattern electrode. In detail, at least one of a first electrode and a second electrode includes pattern electrodes.

The pattern electrodes are disposed to be spaced apart in a gravity direction. In addition, different voltages are applied to each pattern electrode.

The light conversion particles are dispersed in a receiving part in an initial mode or a privacy mode of optical path control member. When the optical path control member is applied to a display device, light conversion particles disposed inside the receiving part may be precipitated in a gravity direction. Thus, the light transmittance may be increased in a region opposite to the gravity direction in the privacy mode.

Accordingly, a negative voltage is applied to any one of the plurality of pattern electrodes. In addition, a positive voltage is applied to the other one of the plurality of pattern electrodes. Thereby, the light conversion particles may move in a direction opposite to the gravity direction.

That is, a negative voltage is applied to one pattern electrode adjacent to an end of the receiving part close to the gravity direction. In addition, a positive voltage is applied to another pattern electrode disposed far from an end of the receiving part. Accordingly, the light conversion particles move in a direction opposite to the gravity direction.

Accordingly, the optical path control member according to an embodiment may control precipitation of the light conversion particles. Accordingly, it is possible to inhibit light transmittance from increasing in the privacy mode.

BEST MODE

Hereinafter, embodiments of the present disclosure will be described in detail with reference to the accompanying drawings. However, the spirit and scope of the present disclosure is not limited to a part of the embodiments described, and may be implemented in various other forms, and within the spirit and scope of the present disclosure, one or more of the elements of the embodiments may be selectively combined and redisposed.

In addition, unless expressly otherwise defined and described, the terms used in the embodiments of the present disclosure (including technical and scientific terms) may be construed the same meaning as commonly understood by one of ordinary skill in the art to which the present disclosure belongs, and the terms such as those defined in commonly used dictionaries may be interpreted as having a meaning that is consistent with their meaning in the context of the relevant art.

In addition, the terms used in the embodiments of the present disclosure are for describing the embodiments and are not intended to limit the present disclosure. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present disclosure, the terms such as first, second, A, B, (a), and (b) may be used. These terms are only used to distinguish the elements from other elements, and the terms are not limited to the essence, order, or order of the elements.

In addition, when an element is described as being "connected", "coupled", or "contacted" to another element, it may include not only when the element is directly "connected" to, "coupled" to, or "contacted" to other elements, but also when the element is "connected", "coupled", or "contacted" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements.

Further, when expressed as "on (over)" or "under (below)", it may include not only the upper direction but also the lower direction based on one element.

Figure 1:
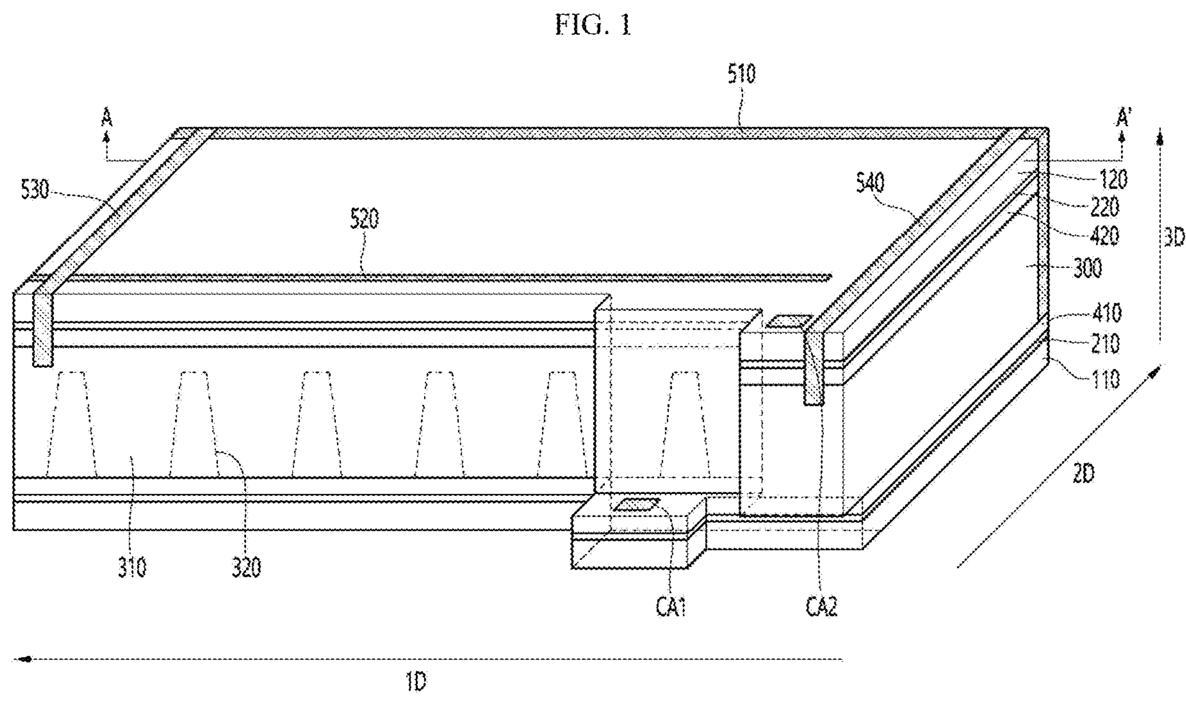
FIG. 1 is a perspective view of an optical path control member according to an embodiment.

FIG. 1 is a perspective view of an optical path control member according to an embodiment.

Referring to FIG. 1, the optical path control member 1000 according to an embodiment includes a first substrate 110, a second substrate 120, a first electrode 210, a second electrode 220, and a light conversion part 300.

The first substrate 110 supports a first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may include any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), Triacetylcellulose (TAC), polyvinyl alcohol (PVA) film, polyimide (PI), or polystyrene (PS).

In addition, the first substrate 110 may be a flexible substrate with flexible characteristics.

Also, the first substrate 110 may be curved or bent. Therefore, the optical path control member may also have flexible, curved, or bent characteristics. Accordingly, the optical path control member may be formed in various designs.

The first substrate 110 may extend in a first direction 1D, a second direction 2D, and a third direction 3D.

Specifically, the first direction 1D and the second direction 2D may correspond to a longitudinal direction or a width direction of the optical path control member. In addition, the first direction 1D and the second direction 2D may be different directions. Also, the third direction 3D may correspond to a thickness direction of the optical path control member.

Hereinafter, for convenience of explanation, the first direction 1D is defined in the longitudinal direction of the optical path control member. Furthermore, the second direction 2D is defined in the width direction of the optical path control member. Furthermore, the third direction 3D is defined in the thickness direction of the optical path control member.

The first substrate 110 has a thickness within a set range. For example, the first substrate 110 may have a thickness of 25 μm to 150 μm.

The first electrode 210 is disposed on one surface of the first substrate 110. In detail, the first electrode 210 is disposed on an upper surface of the first substrate 110. The first electrode 210 is disposed between the first substrate 110 and the second substrate 120.

The first electrode 210 may include a transparent conductive material. For example, the first electrode 210 may include a conductive material having a light transmittance of about 80% or more. For example, the first electrode 210 may include indium tin oxide, indium zinc oxide, copper oxide, tin oxide, zinc oxide, or titanium oxide.

The first electrode 210 may have a thickness of about 10 nm to about 300 nm.

Alternatively, the first electrode 210 may include a metal. Accordingly, the first electrode 210 may have a low resistance. For example, the first electrode 210 may include at least one metal among chromium (Cr), nickel (Ni), copper (Cu), aluminum (Al), silver (Ag), molybdenum (Mo). Gold (Au), titanium (Ti), and alloys thereof.

The first electrode 210 may be entirely disposed on one surface of the first substrate 110. Specifically, the first electrode 210 may include a surface electrode.

Alternatively, the first electrode 210 may be disposed as a pattern electrode on one surface of the first substrate 110. Specifically, the first electrode 210 may include a plurality of pattern electrodes.

Also, the first electrode 210 may include an electrode having a mesh shape.

For example, the first electrode 210 may include a plurality of conductive patterns. In detail, the first electrode 210 may include a plurality of mesh lines crossing each other and a plurality of mesh openings formed by the mesh lines.

Accordingly, even if the first electrode 210 includes metal, it is possible to inhibit the first electrode 210 from being visible from an outside. Accordingly, the visibility of the optical path control member may be improved. Furthermore, since the light transmittance is increased by the openings, the luminance of the optical path control member can be improved.

The second substrate 120 is disposed on the first substrate 110. In detail, the second substrate 120 is disposed on the first electrode 210.

The second substrate 120 may include the same or similar material as that of the first substrate 110.

Also, a thickness of the second substrate 120 may be the same as or similar to the thickness of the first substrate 110. For example, the thickness of the second substrate 120 may be 25 μm to 150 μm.

In addition, the second substrate 120 may also extend in the first direction 1D, the second direction 2D, and the third direction 3D to correspond to the first substrate 110. Hereinafter, for convenience of description, the first direction 1D is defined in the longitudinal direction of the second substrate 120. Also, the second direction 2D is defined in the width direction of the second substrate 120. Also, the third direction 3D is defined in the thickness direction of the second substrate 120.

The second electrode 220 is disposed on one surface of the second substrate 120. Specifically, the second electrode 220 is disposed on a lower surface of the second substrate 120. That is, the second electrode 220 is disposed on one surface of the second substrate 120 where the second substrate 120 and the first substrate 110 face each other. That is, the second electrode 220 is disposed to face the first electrode 210. That is, the second electrode 220 is disposed between the first electrode 210 and the second substrate 120.

The second electrode 220 may include the same or similar material as or to the first electrode 210.

Also, a thickness of the second electrode 220 may be the same as or similar to that of the first electrode 210. For example, a thickness of the second electrode 220 may be about 10 nm to about 300 nm.

Also, a shape of the second electrode 220 may be the same as or similar to that of the first electrode 210. For example, the second electrode 220 may include a surface electrode or a plurality of pattern electrodes.

The first substrate 110 and the second substrate 120 may have the same size or different sizes.

Specifically, a first length of the first substrate 110 in the first direction 1D may be the same as or similar to a second length of the second substrate 120 in the first direction 1D.

For example, the first length and the second length may be 300 mm to 400 mm.

In addition, a first width of the first substrate 110 in the second direction (2D) may be the same as or similar to a second width of the second substrate 120 in the second direction.

For example, the first width and the second width may be 150 mm to 200 mm.

In addition, the first substrate 110 and the second substrate 120 may be formed in different areas.

Figure 2:
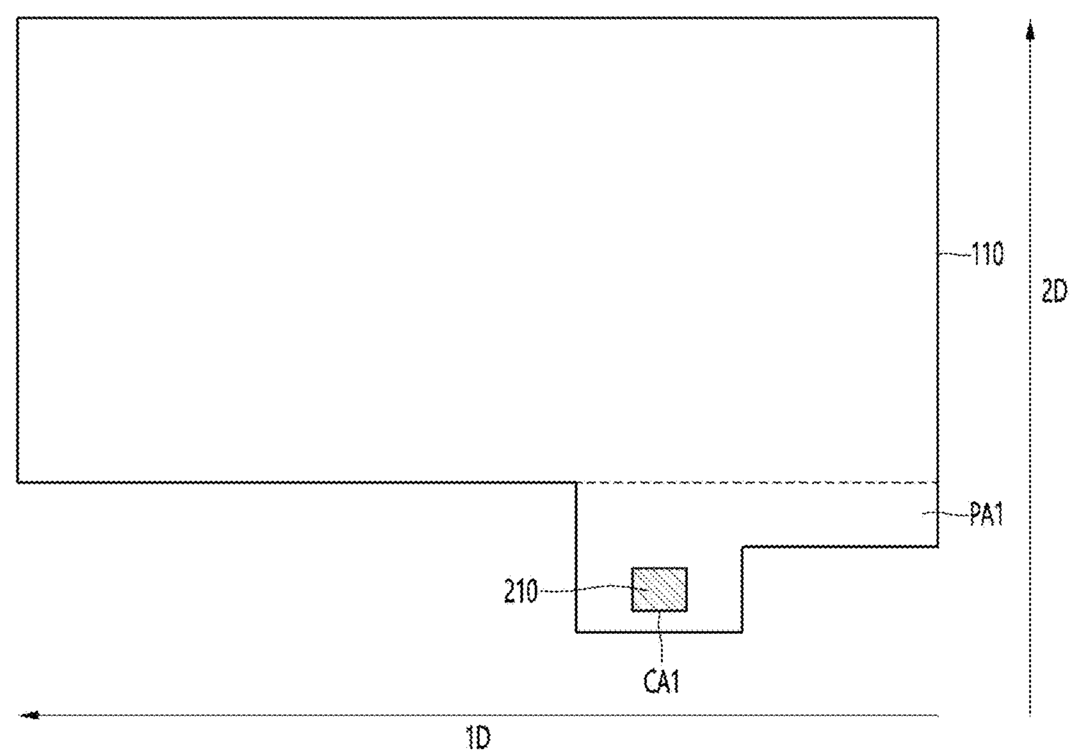
FIG. 2 is a top view of a first substrate of an optical path control member according to an embodiment.
Figure 3:
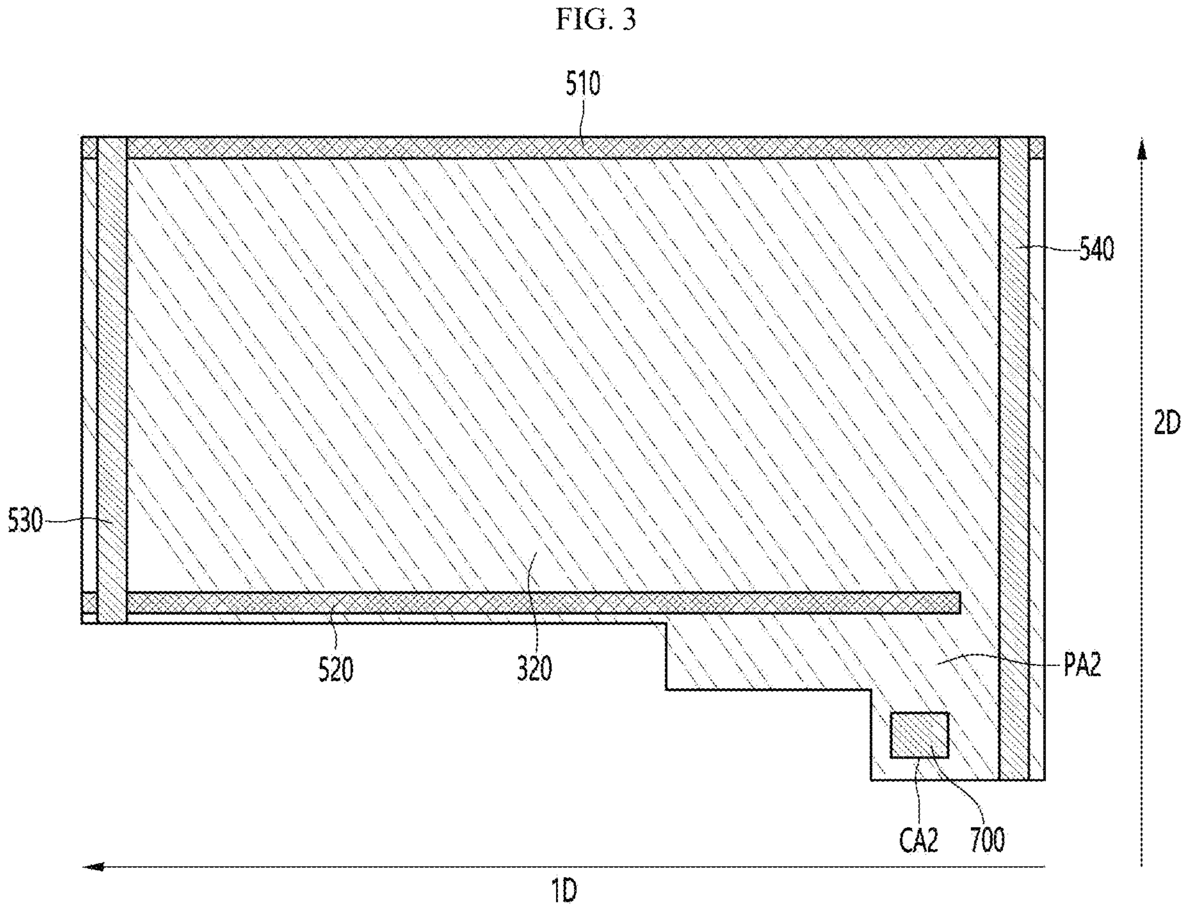
FIG. 3 is a top view of a second substrate of an optical path control member according to an embodiment.

Specifically, the first substrate 110 and the second substrate 120 include protrusions. Referring to FIGS. 2 and 3, the first substrate 110 includes a first protrusion PA1. Also, the second substrate 120 includes a second protrusion PA2. The first protrusion PA1 and the second protrusion PA2 are disposed to be misaligned. That is, the first protrusion PA1 and the second protrusion PA2 do not overlap each other in the third direction 3D.

Alternatively, the first protrusion PA1 and the second protrusion PA2 may include an overlapping region and a non-overlapping region.

The first protrusion PA1 and the second protrusion PA2 may have different areas. Accordingly, the first substrate 110 and the second substrate 120 may have different sizes by the difference in area of the protrusions.

A connection region connected to an external (flexible) printed circuit board may be disposed on each of the first protrusion PA1 and the second protrusion PA2.

Specifically, a first connection region CA1 is disposed on the first protrusion PA1. Also, a second connection region CA2 is disposed on the second protrusion PA2.

The first electrode 210 is exposed in the first connection region CA1. Also, a conductive material 700 is exposed in the second connection region CA2. A cutting region for filling a conductive material is formed in the second protrusion PA2. The conductive material is filled in the cutting region.

The optical path control member and an external (flexible) printed circuit board may be electrically connected by the first connection region CA1 and the second connection region CA2.

For example, a pad part may be disposed on the first connection region CA1 and the second connection region CA2. A conductive adhesive including an anisotropic conductive film (ACF) or anisotropic conductive paste (ACP) may be disposed between the pad part and the (flexible) printed circuit board. Accordingly, the optical path control member may be electrically connected to an external (flexible) printed circuit board.

Alternatively, a conductive adhesive including an anisotropic conductive film (ACF) or anisotropic conductive paste (ACP) is disposed between the first connection region CA1 and the second connection region CA2 and the (flexible) printed circuit board. That is, the pad part may be omitted. Accordingly, the optical path control member may be directly connected to an external (flexible) printed circuit board.

The light conversion part 300 is disposed between the first substrate 110 and the second substrate 120. Specifically, the light conversion part 300 is disposed between the first electrode 210 and the second electrode 220.

An adhesive layer 410 is disposed between the first electrode 210 and the light conversion part 300. Accordingly, the first substrate 110 and the light conversion part 300 may be adhered. The adhesive layer 410 may have a thickness within a predetermined range. For example, the adhesive layer 410 may have a thickness of 10 μm to 30 μm.

Also, a buffer layer 420 is disposed between the second electrode 220 and the light conversion part 300. Accordingly, the adhesion between the second electrode 220 and the light conversion part 300 may be improved. The buffer layer 420 may have a thickness within a set range. For example, the thickness of the buffer layer 420 may be less than 1 μm.

The light conversion part 300 may include a plurality of partition wall parts 310 and a plurality of receiving parts 320. A light conversion material 3300 is disposed inside the receiving part 320. The light transmittance of the optical path control member may be changed by the light conversion particles.

Figure 4:
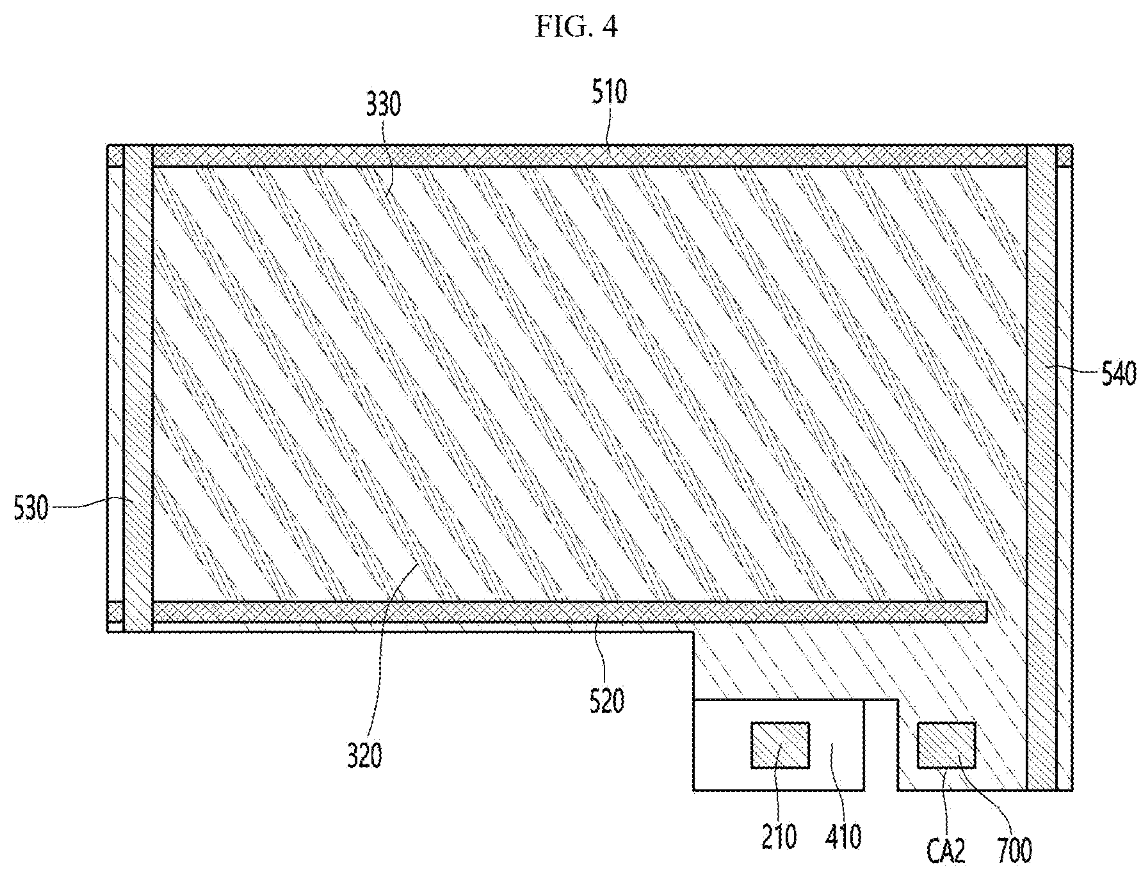
FIG. 4 is a top view of a second substrate in a state in which a first substrate and a second substrate of an optical path control member according to an embodiment are laminated.

Referring to FIGS. 3 and 4, the receiving part 320 may extend in one direction. Specifically, the receiving part 320 may be tilted at an angle within a set range. Accordingly, it is possible to inhibit a moiré phenomenon caused by overlapping the receiving part of the optical path control member and a pattern part of a display panel.

For example, the receiving part 320 may extend in a direction different from the first and second directions 1D and 2D. That is, the receiving part 320 may be tilted with respect to the first direction 1D and the second direction 2D. For example, the receiving part 320 may extend in a direction between the first and second directions 1D and 2D.

The plurality of receiving parts may be sealed by the same or different sealing parts 510, 520, 530, and 540 depending on a direction in which the receiving parts 320 are arranged.

However, embodiments are not limited thereto. That is, the receiving part 320 may extend in the first direction 1D or the second direction 2D.

Figure 5:
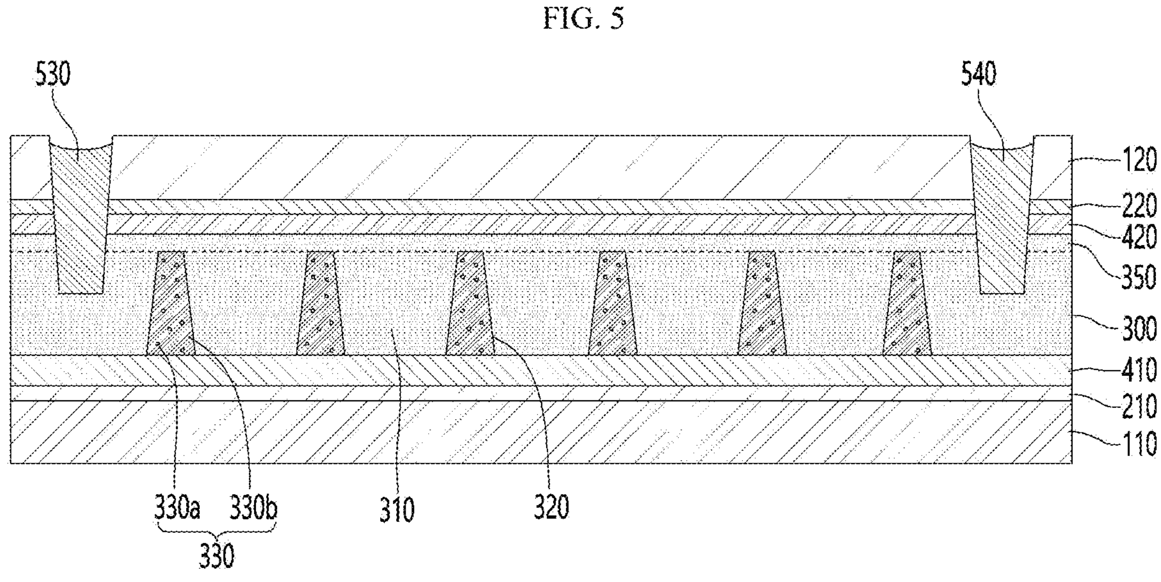
FIGS. 5 and 6 are cross-sectional views taken along line A-A' region of FIG. 1.
Figures 6, 7:
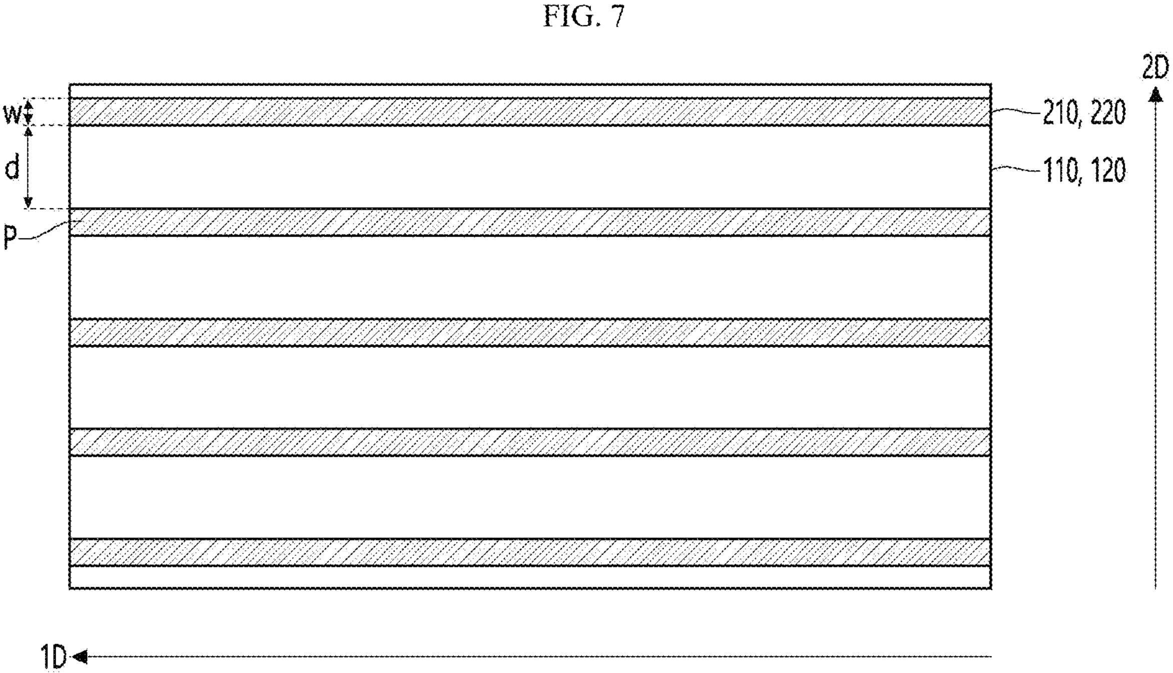
FIGS. 7 and 8 are views for explaining a first electrode and a second electrode of an optical path control member according to an embodiment.

FIGS. 5 and 6 are cross-sectional views taken along line A-A' region of FIG. 1.

Referring to FIGS. 5 and 6, the light conversion part 300 includes a plurality of partition wall parts 310 and a plurality of receiving parts 320.

The partition wall part 310 may divide an receiving part. That is, the partition wall part 310 may transmit light. Accordingly, light emitted from the first substrate 110 or the second substrate 120 may transmit the partition wall part.

The partition wall part 310 and the receiving part 320 may have different widths. For example, a width of the partition wall part 310 may be greater than a width of the receiving part 320.

In addition, the width of the receiving part 320 may be narrowed while extending from the first electrode 210 toward the second electrode 220.

The partition wall part 310 and the receiving part 320 may be alternately disposed. That is, each of the partition wall parts 310 is disposed between the receiving parts 320 adjacent to each other. Also, each receiving part 320 is disposed between the partition wall parts 310 adjacent to each other.

The partition wall part 310 may include a transparent material. The partition wall part 310 may include a material capable of transmitting light.

The partition wall part 310 may include a resin material. For example, the partition wall part 310 may include a photocurable resin material. For example, the partition wall part 310 may include a UV resin or a transparent photoresist resin. Alternatively, the partition wall part 310 may include a urethane resin or an acrylic resin.

The receiving part 320 may be formed by partially passing through the light conversion part 300. Accordingly, the receiving part 320 is in contact with the adhesive layer 410. Also, the receiving part 320 is spaced apart from the buffer layer 420. Accordingly, a base part 350 may be formed between the receiving part 320 and the buffer layer 420.

A light conversion material 330 is disposed inside the receiving part 320. The light conversion material 300 includes light conversion particles 330*a* and a dispersion liquid 330*b*.

The dispersion liquid 330*b* disperses the light conversion particles 330*a*. The dispersion liquid 330*b* may include a transparent material. The dispersion liquid 330*b* may include a non-polar solvent. Also, the dispersion liquid 330*b* may include a material capable of transmitting light. For example, the dispersion liquid 330*b* may include at least one material among halocarbon-based oil, paraffin-based oil, and isopropyl alcohol.

The light conversion particles 330*a* are dispersed in the dispersion liquid 330*b*.

The light conversion particle 330*a* may include a material capable of absorbing light. That is, the light conversion particle 330*a* may be a light-absorbing particle, and the light conversion particle 330*a* may have a color. For example, the light conversion particle 330*a* may have a black-based color. For example, the light conversion particle 330*a* may include carbon black particles.

A surface of the light conversion particle 330*a* may be charged. For example, a surface of the light conversion particle 330*a* may be charged with a negative electrode. Accordingly, the light conversion particle 330*a* may be moved toward the first electrode 210 or the second electrode 220 by applying a voltage.

The light transmittance of the receiving part 320 may be changed by the light conversion particle 330*a*. Accordingly, the receiving part 320 may be changed into a light blocking part and a light transmitting part. That is, the receiving part 330*a* may change the transmittance of light passing through the receiving part 320 by dispersion and aggregation of the light conversion particles 330*a*.

For example, a mode of the optical path member may be switched by a voltage applied thereto. For example, the optical path control member may be switched from a first mode to a second mode. Alternatively, the optical path control member may be switched from the second mode to the first mode.

The receiving part 320 is a light blocking part in the first mode. Accordingly, light of a specific angle is blocked by the receiving part 320. In other words, the viewing angle of the user outside is narrowed. Accordingly, the optical path control member is driven in a privacy mode.

In addition, the receiving part 320 is a light transmitting part in the second mode. Accordingly, light is transmitted from both the partition wall part 310 and the receiving part 320. That is, the viewing angle of the user outside is widened. Accordingly, the optical path control member is driven in a share mode.

Switching to the first mode or the second mode may be implemented by movement of the light conversion particle 330*a*. The surface of the light conversion particle 330*a* has electric charges. The light conversion particle 330*a* may be moved in the direction of the first electrode or the second electrode due to the characteristics of the surface charge.

For example, a voltage may not be applied to the optical path control member. Accordingly, the light conversion particles 330*a* are uniformly dispersed in the dispersion liquid 330*b*. Accordingly, the light of the receiving part 320 is blocked by the light conversion particles 330*a*. Accordingly, the receiving part 320 is driven to the light blocking part in the first mode.

In addition, a voltage may be applied to an optical path control member from the outside. As a result, the light conversion particle 330*a* is moved. For example, the first electrode 210 may be maintained at a ground voltage. In addition, a positive voltage may be applied to the second electrode 220. As a result, the light conversion particle 330*a* may be moved toward the second electrode 220.

For example, when a voltage is applied to the first electrode 210 or the second electrode 220, an electric field is formed between the first electrode 210 and the second electrode 220. Therefore, the light conversion particles 330*a* charged with a negative electrode may be moved in a direction of an electrode having a positively charged electrode among the first electrode 210 and the second electrode 220 using the dispersion liquid 330*b* as a medium.

FIG. 5 illustrates an initial mode state or a state in which a voltage is not applied. In this case, the light conversion particles 330*a* are uniformly dispersed in the dispersion liquid 330*b*. Accordingly, the receiving part 320 is driven by the light blocking part.

FIG. 6 illustrates a state in which a voltage is applied. For example, a ground voltage may be applied to the first electrode 210. Also, a positive voltage may be applied to the second electrode 220. Accordingly, the light conversion particle 330*a* is moved in the direction toward the second electrode 220 in the dispersion liquid 330*b*. That is, the light conversion particle 330*a* is moved in one direction. Accordingly, the receiving part 320 is driven by a light transmitting part.

Accordingly, the optical path control member according to an embodiment may be driven in two modes. Accordingly, the optical path control member according to an embodiment may be driven in two modes according to a user's request.

As described above, a light conversion material 330 is disposed inside the receiving part 320. Also, the optical path control member may be driven in the first mode and the second mode according to the movement of the light conversion particle 330*a*.

In the initial mode or the mode in which the voltage is not applied, the light conversion particles 330*a* are uniformly dispersed in the dispersion liquid 330*b*. Accordingly, the optical path control member is driven in the privacy mode.

The optical path control member may be applied to a notebook computer, a monitor, or a vehicle display. Therefore, the optical path control member is used by being erected in the longitudinal direction of the receiving part during use. Accordingly, the light conversion particles disposed inside the receiving part may be precipitated in the gravity direction.

Accordingly, in the initial mode and the privacy mode, the light conversion particles may move in the gravity direction by gravity.

Accordingly, in the initial mode or the privacy mode, the light conversion particles may be infiltrated in the gravity direction. Thereby, light transmittance can be increased in the upper region of the optical path control member. Accordingly, the characteristics of the privacy mode may be reduced.

The optical path control member according to an embodiment solves the above problems by controlling the shape and driving method of the electrode.

Figure 8:
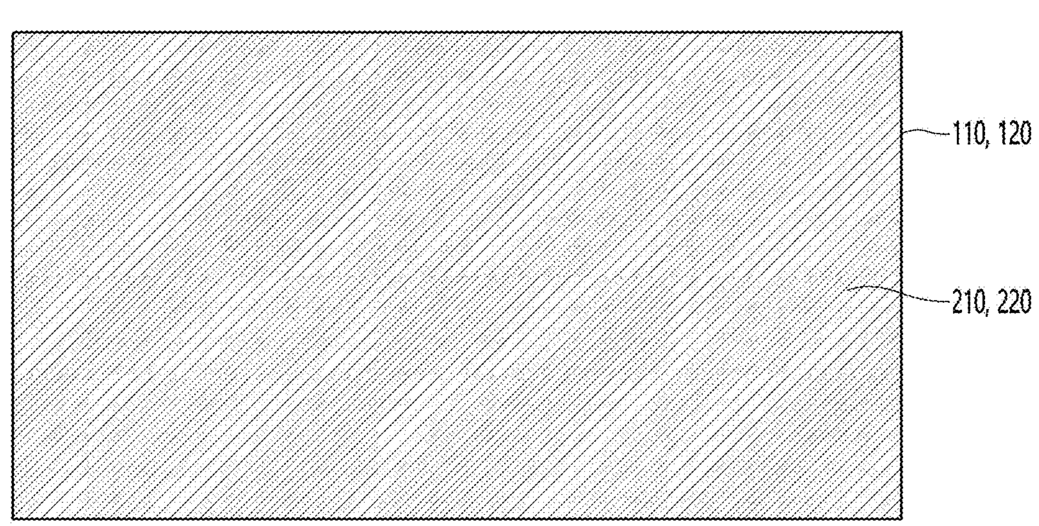

FIGS. 7 and 8 are views for explaining a first electrode and a second electrode of an optical path control member according to an embodiment.

Referring to FIG. 7, at least one of the first electrode 210 and the second electrode 220 includes a pattern electrode P. Specifically, the pattern electrode P may include a plurality of pattern electrodes spaced apart from each other.

The pattern electrode P may extend in one direction. Specifically, the pattern electrode P may extend in a direction different from a direction in which the receiving part 320 extends. For example, the pattern electrode P may extend in the first direction 1D. Also, the pattern electrode P may be spaced apart in the second direction 2D.

The pattern electrode P may be formed with a set width w. Specifically, the width of the pattern electrode P may be 50 μm to 300 μm.

In addition, the pattern electrodes P may be spaced apart at a set interval d. Specifically, the interval between the pattern electrodes P may be 1.5 cm or less.

In addition, the interval between the pattern electrodes P may change while extending in one direction. For example, the pattern electrode P may include a region in which the interval between the pattern electrodes is narrowed while extending in one direction. Alternatively, the interval between the pattern electrodes P may gradually decrease while extending in one direction.

Alternatively, the interval between the pattern electrodes P may change while extending in one direction. For example, the pattern electrode P may include a region in which the interval between the pattern electrodes is widened while extending in one direction. Alternatively, the interval between the pattern electrodes P may be gradually widened while extending in one direction.

The width and the interval of the pattern electrode P may have a range in consideration of movement of light conversion particles to be described below.

Referring to FIG. 8, at least one of the first electrode 210 and the second electrode 220 may include a surface electrode.

For example, the first electrode 210 may include a pattern electrode. Also, the second electrode 220 may include a surface electrode.

Alternatively, the first electrode 210 may include a surface electrode. Also, the second electrode 220 may include a pattern electrode.

Alternatively, both the first electrode 210 and the second electrode 220 may include pattern electrodes Accordingly, it is possible to inhibit the light conversion particles from being precipitated in a gravity direction in the privacy mode.

FIGS. 9 to 12 are views for describing a method for driving a privacy mode of an optical path control member according to an embodiment.

Figure 9:
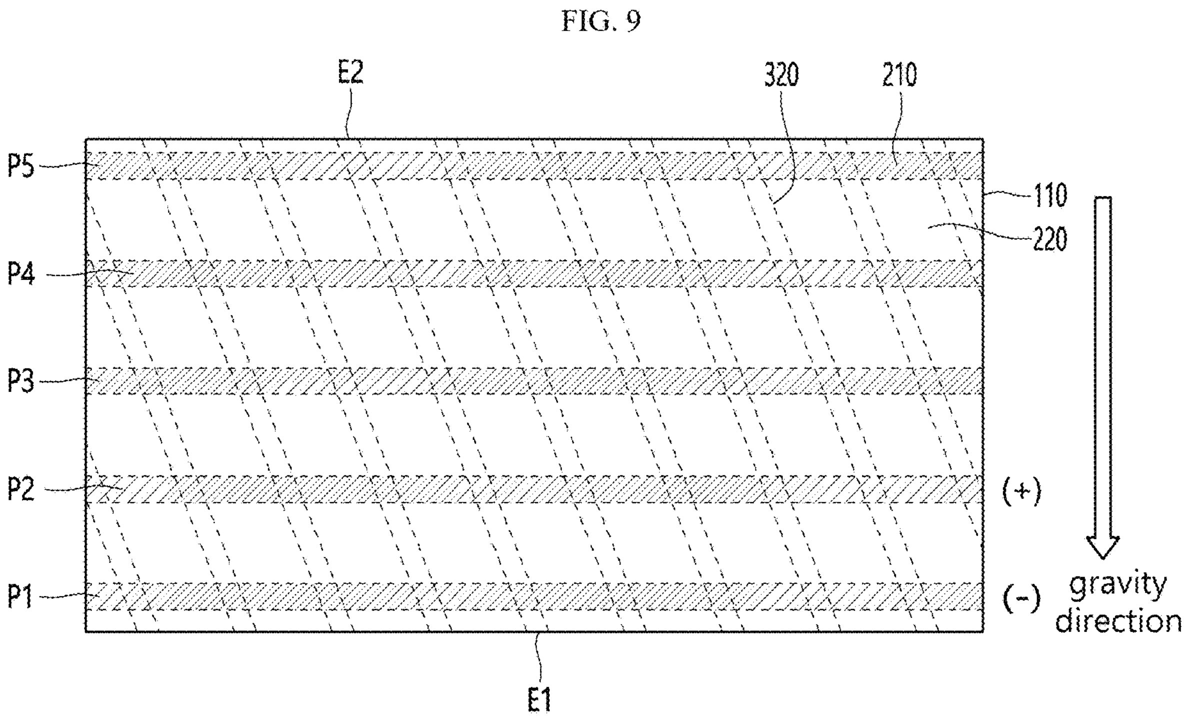
FIGS. 9 to 14 are views for explaining a driving method in a privacy mode of an optical path control member according to an embodiment.

Referring to FIG. 9, one of the first electrode 210 and the second electrode 220 is disposed as a pattern electrode P. Also, the other electrode is disposed as a surface electrode. For example, the first electrode 210 may include the pattern electrode P. Also, the second electrode 2200 may include a surface electrode.

In the initial mode or the privacy mode, a voltage is applied to the first electrode 210.

The first electrode 210 may include a plurality of pattern electrodes. Specifically, the pattern electrode may include a first pattern electrode P1, a second pattern electrode P2, a third pattern electrode P3, a fourth pattern electrode P4, and a fifth pattern electrode P5. For convenience of description, FIG. 9 shows five pattern electrodes, but embodiments are not limited thereto.

The intervals between the first pattern electrode P1, the second pattern electrode P2, the third pattern electrode P3, the fourth pattern electrode P4, and the fifth pattern electrode P5 may be the same or similar.

Alternatively, the intervals between the first pattern electrode P1, the second pattern electrode P2, the third pattern electrode P3, the fourth pattern electrode P4, and the fifth pattern electrode P5 may be different.

For example, the first electrode 210 may include a region in which an interval between the pattern electrodes P1, P2, P3, P4, and P5 is narrowed while extending in a direction from the first pattern electrode P1 toward the fifth pattern electrode P5. Alternatively, intervals between the pattern electrodes P1, P2, P3, P4, and P5 of the first electrode 210 may be gradually narrowed while extending in a direction from the first pattern electrode P1 toward the fifth pattern electrode P5.

Alternatively, the first electrode 210 may include a region in which an interval between the pattern electrodes P1, P2, P3, P4, and P5 is widen narrowed while extending in a direction from the first pattern electrode P1 toward the fifth pattern electrode P5. Alternatively, intervals between the pattern electrodes P1, P2, P3, P4, and P5 of the first electrode 210 may be gradually widen while extending in a direction from the first pattern electrode P1 toward the fifth pattern electrode P5.

A first end E1 and a second end E2 of the receiving part 320 may be defined in the longitudinal direction of the receiving part 320.

The first pattern electrode P1 may be disposed adjacent to the first end E1. Also, the second pattern electrode P2 may be disposed farther from the first end E1 than the first pattern electrode P1. Also, the third pattern electrode P3 may be disposed farther from the first end E1 than the second pattern electrode P2. Also, the fourth pattern electrode P4 may be disposed farther from the first end E1 than the third pattern electrode P3. Also, the fifth pattern electrode P5 may be disposed farther from the first end E1 than the fourth pattern electrode P4.

That is, the first pattern electrode P1, the second pattern electrode P2, the third pattern electrode P3, the fourth pattern electrode P4, and the fifth pattern electrode P5 may be disposed at different positions.

Referring to FIG. 9, when a direction from the second end E2 toward the first end E1 is defined as the gravity direction, the light conversion particle 330*a* provided in the receiving part 320 may be precipitated toward the first end E1 in an initial mode and a privacy mode. That is, the light conversion particle 333*a* may be precipitated in a direction toward the first end E1 by the gravity.

A voltage may be applied to the pattern electrode to inhibit precipitation of the light conversion particles 330*a*.

Specifically, a negative voltage may be applied to the first pattern electrode P1. Also, a positive voltage may be applied to the second pattern electrode P2.

Alternatively, a negative voltage may be applied to the second pattern electrode P2. Also, a positive voltage may be applied to the third pattern electrode P3.

Alternatively, a negative voltage may be applied to the third pattern electrode P3. Also, a positive voltage may be applied to the fourth pattern electrode P4.

Alternatively, a negative voltage may be applied to the fourth pattern electrode P4. Also, a positive voltage may be applied to the fifth pattern electrode P5.

That is, a negative voltage and a positive voltage may be respectively applied to at least two of the pattern electrodes P1, P2, P3, P4, and P5 in consideration of the degree of precipitation of the light conversion particles 330*a*.

Alternatively, a voltage having the same polarity as a polarity of the light conversion particles may be applied to the first pattern electrode P1. Further, a voltage having a polarity different from that of the light conversion particles may be applied to the second pattern electrode P2. Subsequently, after the applied voltage is stopped, a voltage having the same polarity as a polarity of the light conversion particles may be applied to the second pattern electrode P2. Further, a voltage having a polarity different from that of the light conversion particles may be applied to the third pattern electrode P3. Subsequently, after the applied voltage is stopped, a voltage having the same polarity as a polarity of the light conversion particles may be applied to the third pattern electrode P3. Further, a voltage having a polarity different from that of the light conversion particles may be applied to the fourth pattern electrode P4. Subsequently, after the applied voltage is stopped, a voltage having the same polarity as a polarity of the light conversion particles may be applied to the fourth pattern electrode P4. Further, a voltage having a polarity different from that of the light conversion particles may be applied to the fifth pattern electrode P5.

Alternatively, a voltage may be applied by forming each electrode pattern as a group. For example, a voltage having the same polarity as a polarity of the light conversion particle may be applied to the first pattern electrode P1 and the second pattern electrode P2. Also, a voltage having a polarity different from that of the light conversion particle may be applied to the third pattern electrode P3 and the fourth pattern electrode P4. Subsequently, after the applied voltage is stopped, a voltage having the same polarity as a polarity of the light conversion particle may be applied to the second pattern electrode P2 and the third pattern electrode P3. Also, a voltage having a polarity different from that of the light conversion particle may be applied to the fourth pattern electrode P4 and the fifth pattern electrode P5.

Accordingly, the light conversion particle may move from the first pattern electrode P1 to the fifth pattern electrode P5. That is, the light conversion particle 330*a* may move by voltages having different polarities applied from the pattern electrode. That is, the light conversion particle precipitated toward the first end E1 may move toward the second end E2 by the negative voltage and the positive voltage.

Accordingly, the precipitated light conversion particles 330*a* may be uniformly dispersed in the receiving part.

Also, the extending direction of the pattern electrode and the extending direction of the receiving part are tilted at an angle within a set range. Accordingly, an embodiment may reduce the time during which the light conversion particles 330*a* are sedimented again.

Figure 10:
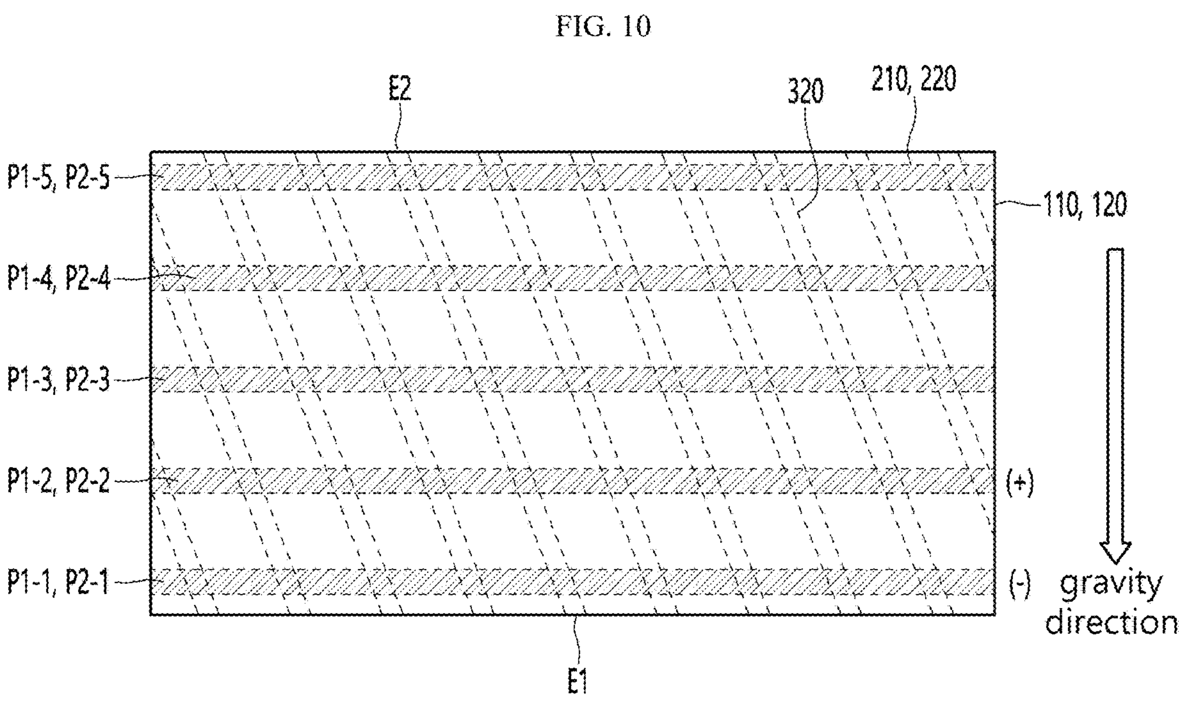
Figure 11:
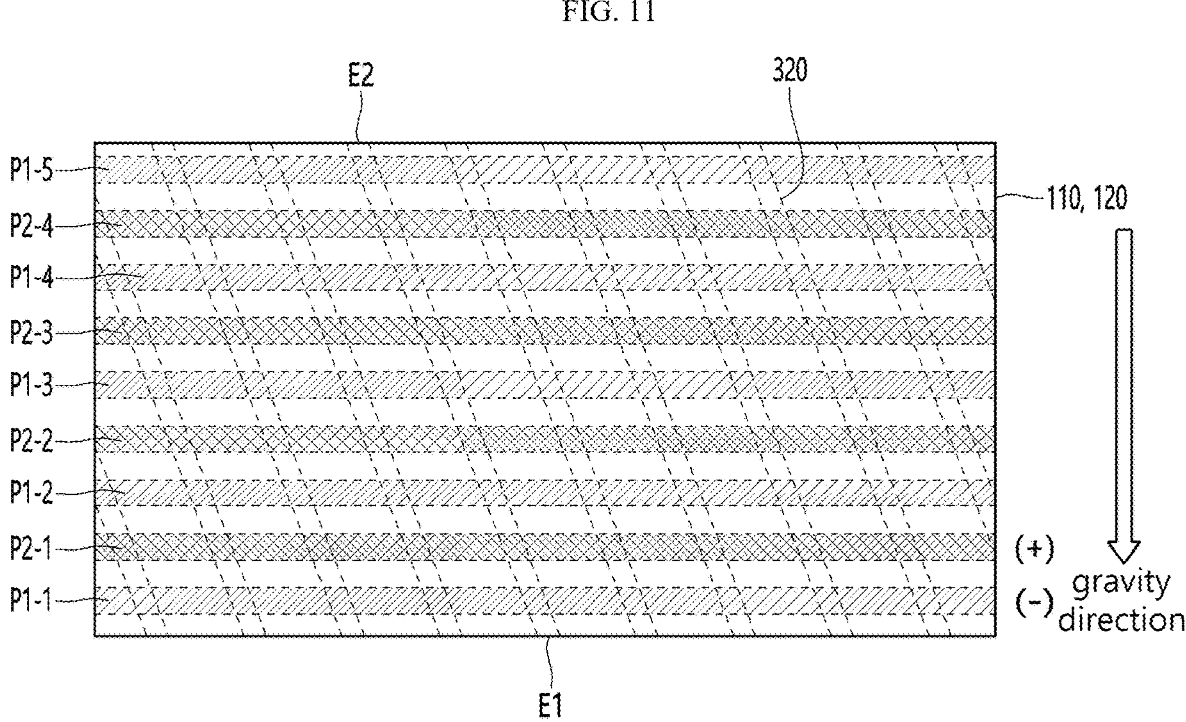
Figure 12:
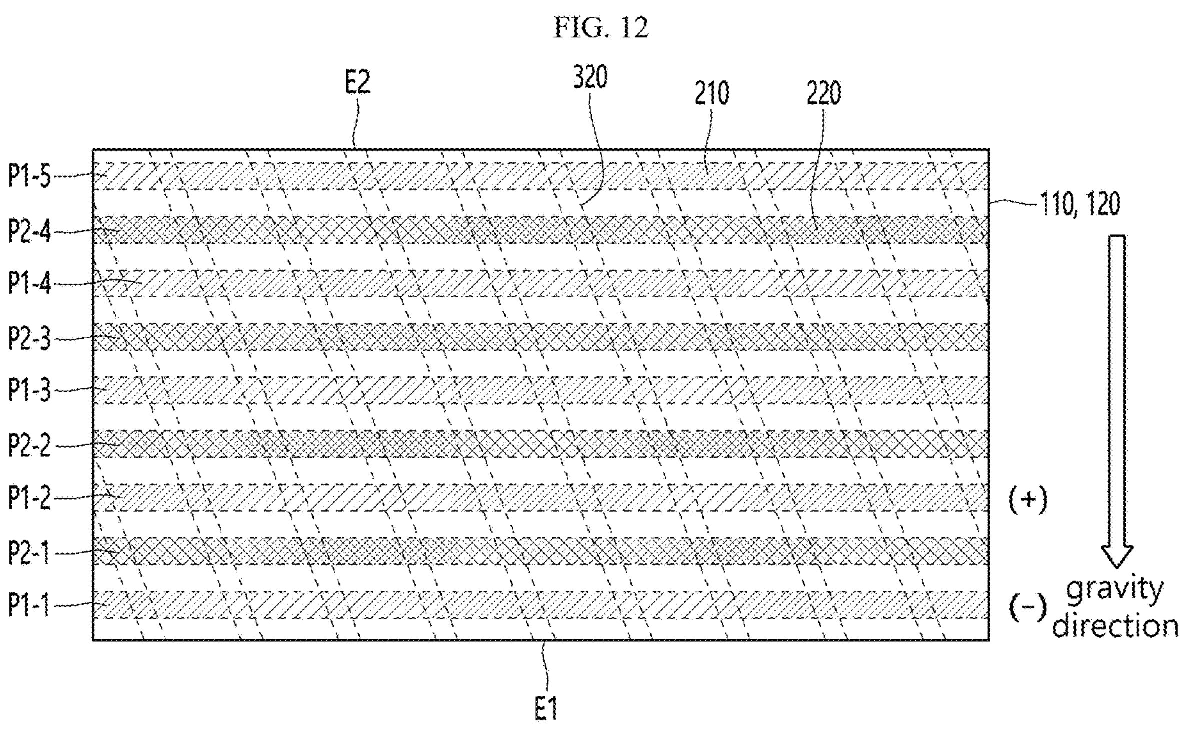

Referring to FIGS. 10 to 12, both the first electrode 210 or the second electrode 220 may be disposed as a pattern electrode P.

In the initial mode and the privacy mode, a voltage may be applied to at least one of the first electrode 210 and the second electrode 220.

The first electrode 210 may include a first-first pattern electrode P1-1, a first-second pattern electrode P1-2, a first-third pattern electrode P1-3, a first-fourth pattern electrode P1-4, and a first-fifth pattern electrode P1-5.

The first-first pattern electrode P1-1 is disposed adjacent to the first end E1. The first-second pattern electrode P1-2, the first-third pattern electrode P1-3, the first-fourth pattern electrode P1-4, and the first-fifth pattern electrode P1-5 are disposed to be gradually farther away from the first end E1 than the first-first pattern electrode P1-1.

Also, the second electrode 220 may include a second-first pattern electrode P2-1, a second-second pattern electrode P2-2, a second-third pattern electrode P2-3, and a second-fourth pattern electrode P2-4.

The second-first pattern electrode P2-1 is disposed adjacent to the first end E1. The second-second pattern electrode P2-2, the second-third pattern electrode P2-3, and the second-fourth pattern electrode P2-4 are disposed to be gradually farther away from the first end E1 than the second-first pattern electrode P2-1.

The pattern electrode of the first electrode 210 and the pattern electrode of the second electrode 220 may overlap each other in the third direction 3D. Alternatively, the pattern electrode of the first electrode 210 and the pattern electrode of the second electrode 220 may not overlap each other in the third direction 3D.

For example, referring to FIG. 10, the pattern electrode of the first electrode 210 and the pattern electrode of the second electrode 220 may entirely or partially overlap each other in the third direction 3D. That is, the pattern electrode of the first electrode 210 and the pattern electrode of the second electrode 220 face each other in the third direction 3D.

Voltages may be applied to the first electrode 210 and the second electrode 220, respectively. Specifically, voltages having different polarities may be applied to the first electrode 210 and the second electrode 220.

For example, a negative voltage may be applied to the first-first pattern electrode P1-1. Also, a positive voltage may be applied to the second-second pattern electrode P2-2. The first-first pattern electrode P1-1 is disposed closer to the first end E1 than the second-second pattern electrode P2-2. Accordingly, the light conversion particle may move from the first end E1 to the second end E2.

Alternatively, a negative voltage may be applied to the first-second pattern electrode P1-2. Also, a positive voltage may be applied to the second-third pattern electrode P2-3.

Alternatively, a negative voltage may be applied to the first-third pattern electrode P1-3. Also, a positive voltage may be applied to the second-fourth pattern electrode P2-4.

Accordingly, the light conversion particle may move from the first end E1 to the second end E2.

Alternatively, referring to FIG. 11, the pattern electrode of the first electrode 210 and the pattern electrode of the second electrode 220 may not overlap each other in the third direction 3D. That is, the pattern electrode of the first electrode 210 and the pattern electrode of the second electrode 220 do not face each other in the third direction 3D.

That is, the pattern electrode of the first electrode 210 and the pattern electrode of the second electrode 220 may be alternately disposed. For example, the pattern electrode of the second electrode 220 may be disposed between the pattern electrodes of the first electrode 210. That is, the second-first pattern electrode P2-1 may be disposed between the first-first pattern electrode P1-1 and the first-second pattern electrode P1-2.

Referring to FIG. 11, voltages may be respectively applied to the first electrode 210 and the second electrode 220. Specifically, voltages having different polarities may be applied to the first electrode 210 and the second electrode 220.

For example, a negative voltage may be applied to the first-first pattern electrode P1-1. Also, a positive voltage may be applied to the second-first pattern electrode P2-1.

Alternatively, a negative voltage may be applied to the first-second pattern electrode P1-2. Also, a positive voltage may be applied to the second-second pattern electrode P2-2.

Alternatively, a negative voltage may be applied to the first-third pattern electrode P1-3. Also, a positive voltage may be applied to the second-third pattern electrode P2-3.

Alternatively, a negative voltage may be applied to the first-fourth pattern electrode P1-4. Also, a positive voltage may be applied to the second-fourth pattern electrode P2-4.

Alternatively, a negative voltage may be applied to the second-first pattern electrode P2-1. Also, a positive voltage may be applied to the first-second pattern electrode P1-2.

Alternatively, a negative voltage may be applied to the second-second pattern electrode P2-2. Also, a positive voltage may be applied to the first-third pattern electrode P1-3.

Alternatively, a negative voltage may be applied to the second-third pattern electrode P2-3. Also, a positive voltage may be applied to the first-fourth pattern electrode P1-4.

Alternatively, a negative voltage may be applied to the second-fourth pattern electrode P2-4. Also, a positive voltage may be applied to the first-fifth pattern electrode P1-5.

That is, voltages having different polarities may be applied to the pattern electrode of the first electrode 210 and the pattern electrode of the second electrode 220 in consideration of the degree of precipitation of the light conversion particles 330*a*.

Accordingly, the light conversion particles 330*a* may move by voltages of different polarities applied from the pattern electrode. That is, the light conversion particles precipitated in the gravity direction may move in a direction opposite to the gravity direction by a negative voltage and a positive voltage.

Accordingly, the precipitated light conversion particles 330*a* may be dispersed in the receiving part again.

Referring to FIG. 12, both of the first electrode 210 and the second electrode 220 may include a pattern electrode. Also, a voltage may be applied to only one of the first electrode 210 and the second electrode 220. That is, a positive voltage and a negative voltage may be applied to any one of the first electrode 210 and the second electrode 220 as shown in FIG. 10.

That is, when the first electrode 210 includes the pattern electrode, a negative voltage may be applied to the first-first pattern electrode. Also, a positive voltage may be applied to the first-second pattern electrode.

Alternatively, when the second electrode 220 includes a pattern electrode, a negative voltage may be applied to the second-first pattern electrode. Also, a positive voltage may be applied to the second-second pattern electrode.

Accordingly, the light conversion particle 330*a* may move by voltages of different polarities applied from any one of the first electrode 210 and the second electrode 220. That is, the light conversion particle precipitated in the gravity direction may move in a direction opposite to the gravity direction by a negative voltage and a positive voltage.

Figure 13:
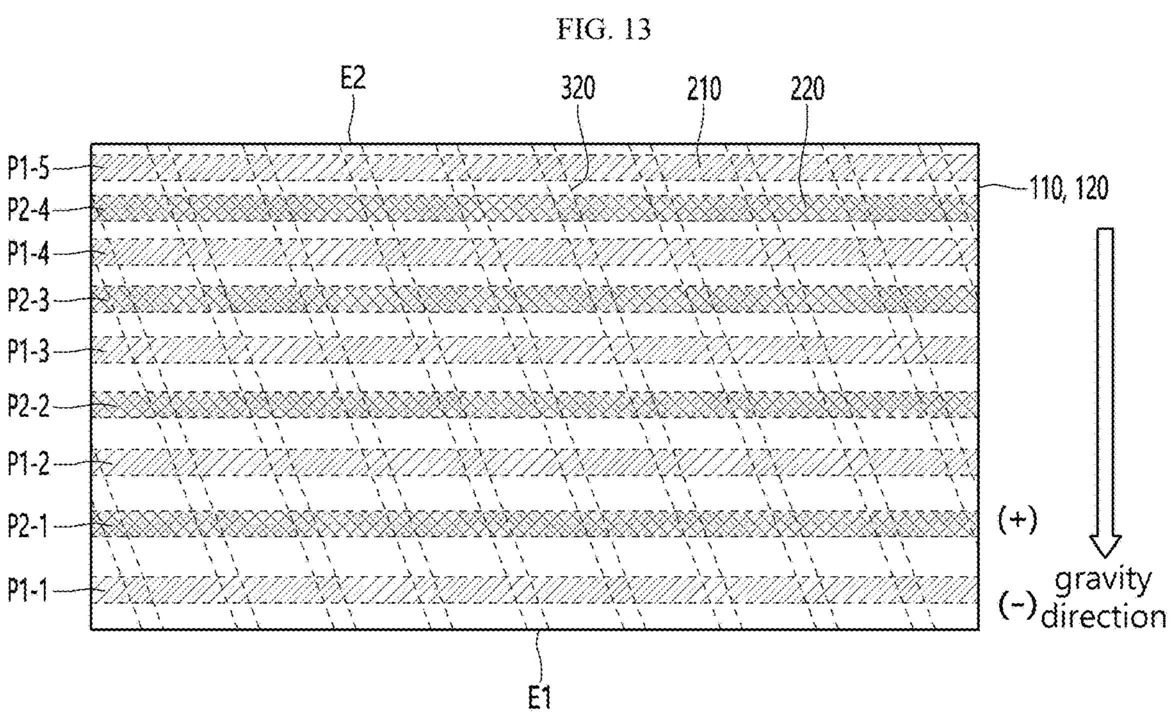
Figure 14:
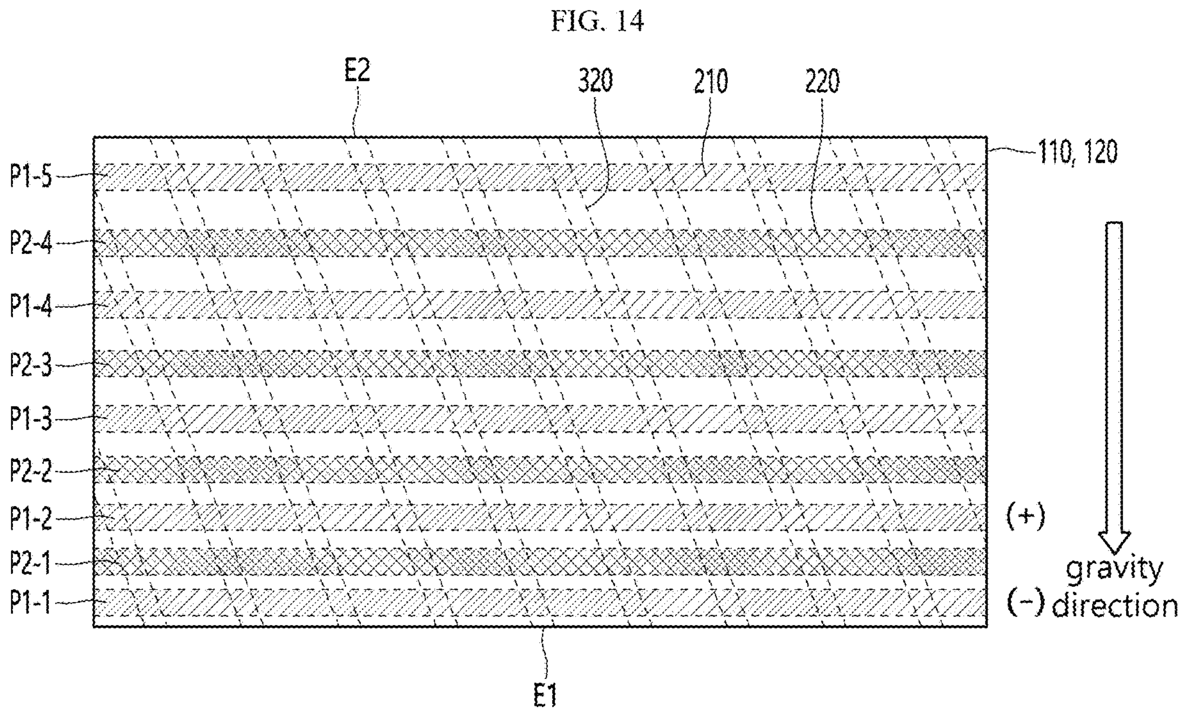

Referring to FIGS. 13 and 14, the first electrode 210 and the second electrode 220 may be disposed at different intervals for each position.

Referring to FIG. 13, the first electrode 210 and the second electrode 220 may include a region in which an interval between the first electrode 210 and the second electrode 220 decreases while extending in a direction from the first-first pattern electrode P1-1 toward the first-fifth pattern electrode P1-5. Alternatively, the interval between the first electrode 210 and the second electrode 220 may gradually decrease while extending in a direction from the first-first pattern electrode P1-1 toward the first-fifth pattern electrode P1-5.

Alternatively, referring to FIG. 14, the first electrode 210 and the second electrode 220 may include a region in which the interval between the first electrode 210 and the second electrode 220 is widened while extending in a direction from the first-first pattern electrode P1-1 toward the first-fifth pattern electrode P1-5. Alternatively, the interval between the first electrode 210 and the second electrode 220 may be gradually widened while extending in a direction from the first-first pattern electrode P1-1 toward the first-fifth pattern electrode P1-5.

The interval between the pattern electrodes may vary while extending in one direction. Accordingly, precipitation of light conversion particles that vary according to the characteristics of the light conversion particles may be easily controlled.

That is, the light conversion particles may have polarities of various sizes according to an applied voltage. Accordingly, the light conversion particles may have different precipitation speeds and precipitation depths for each position according to the polarity size of the light conversion particles.

In addition, the light conversion particles may have polarities of various sizes according to a material and an applied voltage. Accordingly, the light conversion particles may have different precipitation speeds and precipitation depths according to a material and an applied voltage.

Therefore, the intervals of the pattern electrodes may be formed at various intervals. Accordingly, precipitation of light conversion particles having various precipitation characteristics may be effectively inhibited.

The optical path control member according to the embodiment includes a pattern electrode. In detail, at least one of a first electrode and a second electrode includes pattern electrodes.

The pattern electrodes are disposed to be spaced apart in a gravity direction. In addition, different voltages are applied to each pattern electrode.

The light conversion particles are dispersed in a receiving part in an initial mode or a privacy mode of optical path control member. When the optical path control member is applied to a display device, light conversion particles disposed inside the receiving part may be precipitated in a gravity direction. Thus, the light transmittance may be increased in a region opposite to the gravity direction in the privacy mode.

Accordingly, a negative voltage is applied to any one of the plurality of pattern electrodes. In addition, a positive voltage is applied to the other one of the plurality of pattern electrodes. Thereby, the light conversion particles may move in a direction opposite to the gravity direction.

That is, a negative voltage is applied to one pattern electrode adjacent to an end of the receiving part close to the gravity direction. In addition, a positive voltage is applied to another pattern electrode disposed far from an end of the receiving part. Accordingly, the light conversion particles move in a direction opposite to the gravity direction.

Accordingly, the optical path control member according to an embodiment may control precipitation of the light conversion particles. Accordingly, it is possible to inhibit light transmittance from increasing in the privacy mode.

Meanwhile, the pattern electrode P may be formed with a set width. Specifically, the width of the pattern electrode P may be 50 μm to 300 μm. More specifically, the width of the pattern electrode P may be 100 μm to 250 μm. More specifically, the width of the pattern electrode P may be 150 μm to 200 μm.

When the width of the pattern electrode is less than 50 μm, it becomes difficult to generate a potential difference capable of sufficiently moving the light conversion particles when a voltage is applied to the pattern electrode. Also, when the width of the pattern electrode exceeds 300 μm, the width of the pattern electrode increases. Accordingly, the number of pattern electrodes decreases. Accordingly, it becomes difficult to accurately move the light conversion particles.

In addition, the pattern electrodes P may be formed at set intervals. In detail, the interval between the pattern electrodes P may be 1.5 cm or less. In more detail, the interval between the pattern electrodes P may be 1.3 cm or less. In more detail, the interval between the pattern electrodes P may be 1.0 cm or less. For example, the interval between the pattern electrodes P may be 0.5 cm to 1.5 cm.

When the interval between the pattern electrodes P exceeds 1.5 cm, the interval between the pattern electrodes increases. Accordingly, when a voltage is applied to the pattern electrode, it becomes difficult to generate a potential difference capable of sufficiently moving the light conversion particles.

Referring to FIGS. 15 to 18, the first electrode 210 and the second electrode 220 are connected to a printed circuit board.

Figure 15:
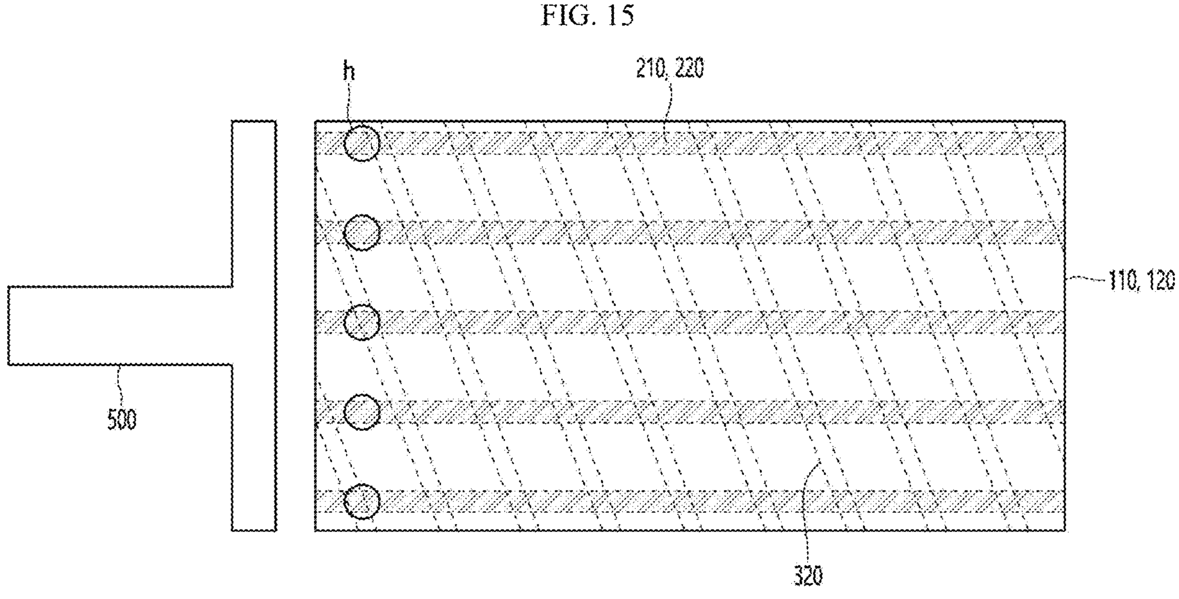
FIGS. 15 to 18 are views for explaining a connection between a connection region of a first electrode and a second electrode and a printed circuit board of an optical path control member according to an embodiment.
Figures 16, 17:
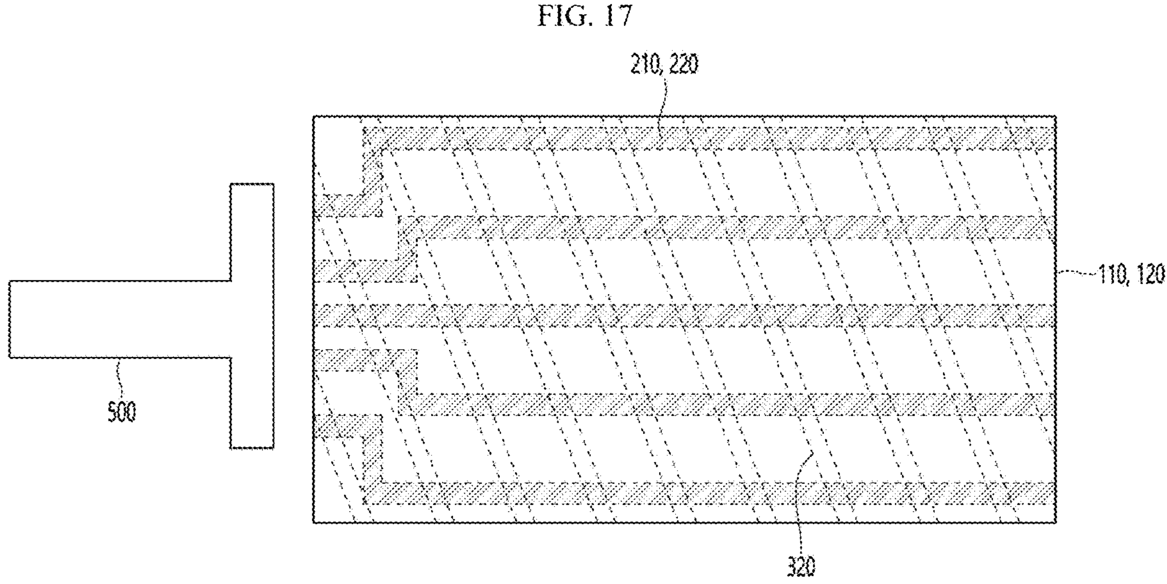

Referring to FIGS. 15 and 16, each of the pattern electrodes P is connected to the pad part of the printed circuit board 500. Specifically, each of the pattern electrodes P is disposed to extend in one direction. Also, a terminal part of the pattern electrode P and the pad part of the printed circuit board 500 are connected.

At least one hole may be formed in the first substrate 110 or the second substrate 120 to expose the terminal part of the pattern electrode P.

For example, referring to FIG. 15, the first substrate 110 or the second substrate 120 may include a plurality of holes h formed in regions corresponding to each pattern electrode. The number of holes h may correspond to the number of the pattern electrodes P.

Alternatively, referring to FIG. 16, the first substrate 110 or the second substrate 120 may include a plurality of holes h formed in regions corresponding to each pattern electrode. Also, the number of holes h may be less than the number of the pattern electrodes P. For example, one hole h may expose at least two pattern electrodes. Accordingly, the number of holes formed in the first substrate 110 or the second substrate 120 may be reduced. Accordingly, process efficiency may be improved.

Referring to FIG. 17, at least one pattern electrode in the pattern electrode P includes a bent portion. The terminal part of the pattern electrode P may be collected in one region by the bent portion.

Accordingly, the width of the connection region of the pattern electrode P is reduced. Accordingly, the size of the printed circuit board 500 is reduced. Also, an area of the connection region between the printed circuit board and the pattern electrode is reduced.

Figure 18:
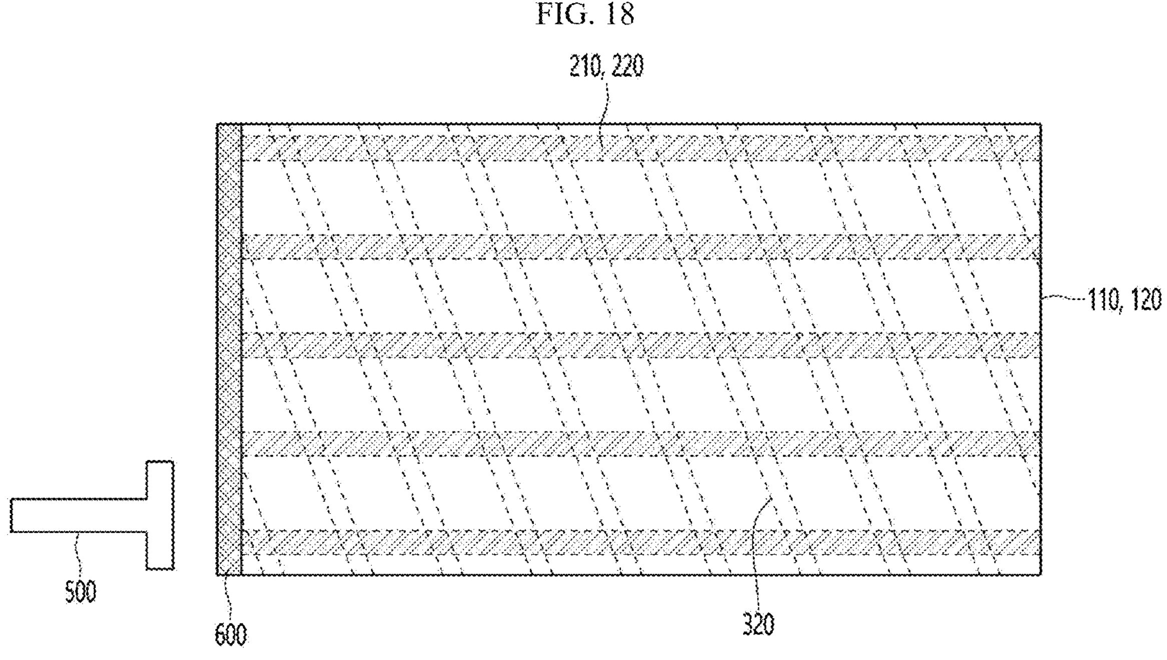

Referring to FIG. 18, a gate array 600 may be disposed between the pattern electrode P and the printed circuit board 500. Specifically, the gate array 600 is connected to terminal parts of a plurality of pattern electrodes.

Accordingly, terminals of the plurality of pattern electrodes may be combined into one terminal of the gate array. Subsequently, one terminal of the gate array and the printed circuit board may be connected. Accordingly, the size of the printed circuit board 500 is reduced. Also, the area of the connection region between the printed circuit board and the pattern electrode is reduced.

Hereinafter, a display device and a display device to which an optical path control member according to an embodiment is applied will be described with reference to FIGS. 19 to 23.

Figure 19:
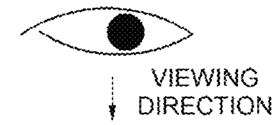
FIGS. 19 and 20 are cross-sectional views of a display device to which an optical path control member according to an embodiment is applied.
Figure 19:
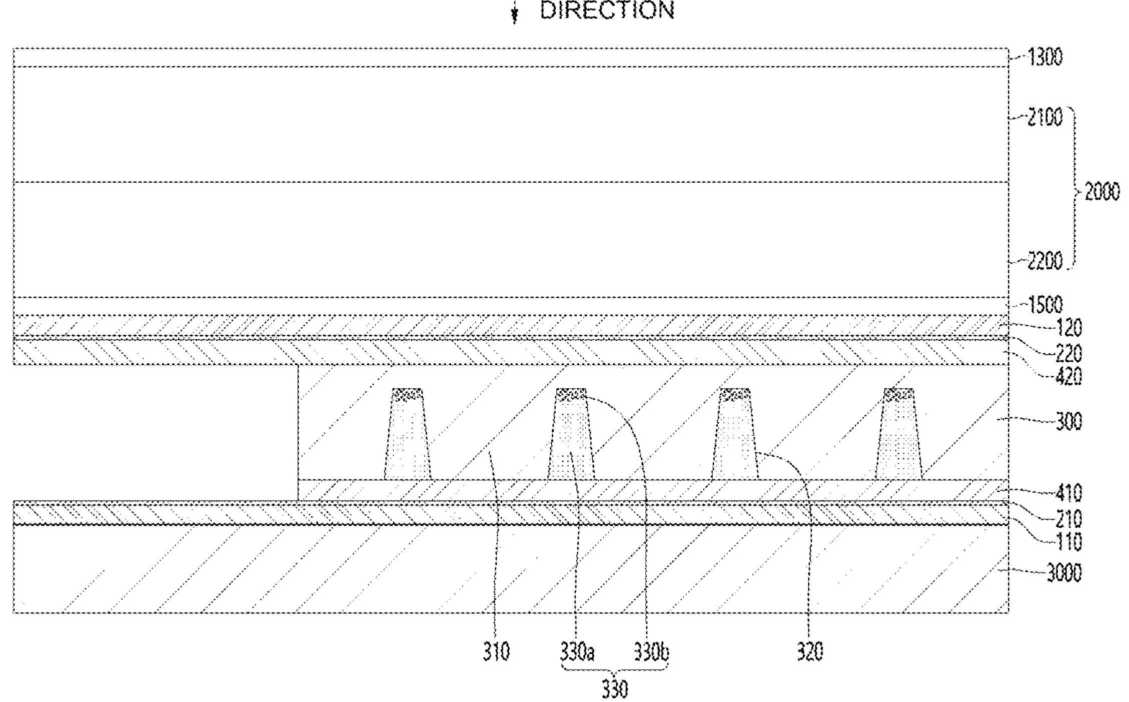
Figure 20:
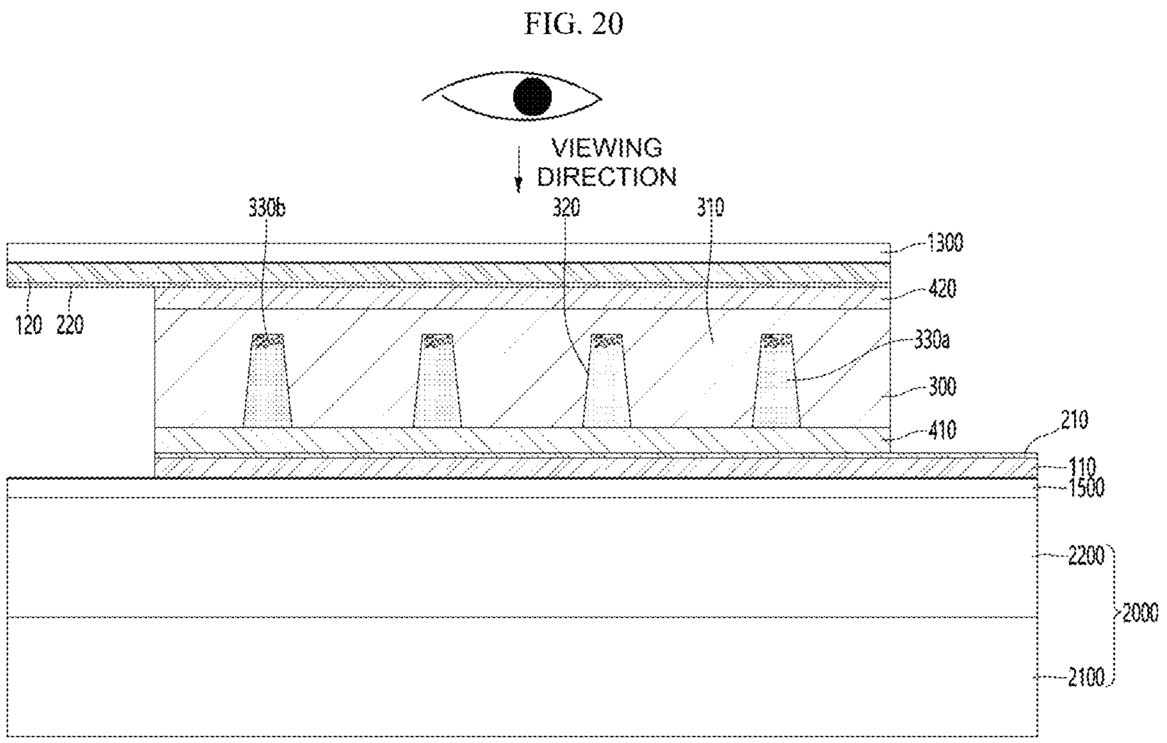

Referring to FIGS. 19 and 20, the optical path control member 1000 according to the embodiment may be disposed on or below the display panel 2000.

The display panel 2000 and the optical path control member 1000 may be disposed to be adhered to each other. For example, the display panel 2000 and the optical path control member 1000 may be adhered to each other via an adhesive member 1500. The adhesive member 1500 may be transparent. For example, the adhesive member 1500 may include an adhesive or an adhesive layer including an optical transparent adhesive material.

The adhesive member 1500 may include a release film. In detail, when adhering the optical path control member and the display panel, the optical path control member and the display panel may be adhered after the release film is removed.

The display panel 2000 may include a first base 2100 and a second base 2200. When the display panel 2000 is a liquid crystal display panel, the optical path control member may be formed under the liquid crystal panel. That is, when a surface viewed by the user in the liquid crystal panel is defined as an upper portion of the liquid crystal panel, the optical path control member may be disposed under the liquid crystal panel. The display panel 2000 may be formed in a structure in which the first base 2100 including a thin film transistor (TFT) and a pixel electrode and the second base 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first base 2100 and the second base 2200 is bonded to the first base 2100 with the liquid crystal layer interposed therebetween. That is, a thin film transistor may be formed on the first base 2100, a protective film may be formed on the thin film transistor, and a color filter layer may be formed on the protective film. In addition, a pixel electrode in contact with the thin film transistor may be formed on the first base 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 19, the optical path control member may be disposed under the liquid crystal panel and on the backlight unit 3000, and the optical path control member may be disposed between the backlight unit 3000 and the display panel 2000.

Alternatively, as shown in FIG. 20, when the display panel 2000 is an organic light emitting diode panel, the optical path control member may be formed on the organic light emitting diode panel. That is, when the surface viewed by the user in the organic light emitting diode panel is defined as an upper portion of the organic light emitting diode panel, the optical path control member may be disposed on the organic light emitting diode panel. The display panel 2000 may include a self-luminous element that does not require a separate light source. In the display panel 2000, a thin film transistor may be formed on the first base 2100, and an organic light emitting element in contact with the thin film transistor may be formed. The organic light emitting element may include an anode, a cathode, and an organic light emitting layer formed between the anode and the cathode. In addition, the second base 2200 configured to function as an encapsulation substrate for encapsulation may be further included on the organic light emitting element.

In addition, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be a linear polarizing plate. Further, when the display panel 2000 is the organic light emitting diode panel, the polarizing plate may be an external light reflection inhibiting polarizing plate.

In addition, an additional functional layer 1300 such as an anti-reflection layer, an anti-glare, or the like may be further disposed on the optical path control member 1000. Specifically, the functional layer 1300 may be adhered to one surface of the first substrate 110 of the optical path control member. Although not shown in drawings, the functional layer 1300 may be adhered to the first substrate 110 of the optical path control member via an adhesive layer. In addition, a release film for protecting the functional layer may be further disposed on the functional layer 1300.

Further, a touch panel may be further disposed between the display panel and the optical path control member.

It is shown in the drawings that the optical path control member is disposed at an upper portion of the display panel, but the embodiment is not limited thereto, and the optical path control member may be disposed at various positions such as a position in which light is adjustable, that is, a lower portion of the display panel, or between a second substrate and a first substrate of the display panel, or the like.

In addition, it is shown in the drawings that the light conversion part of the optical path control member according to the embodiment is in a direction parallel or perpendicular to an outer surface of the second substrate, but the light conversion part is formed to be inclined at a predetermined angle from the outer surface of the second substrate. Through this, a moiré phenomenon occurring between the display panel and the optical path control member may be reduced.

Figure 21:
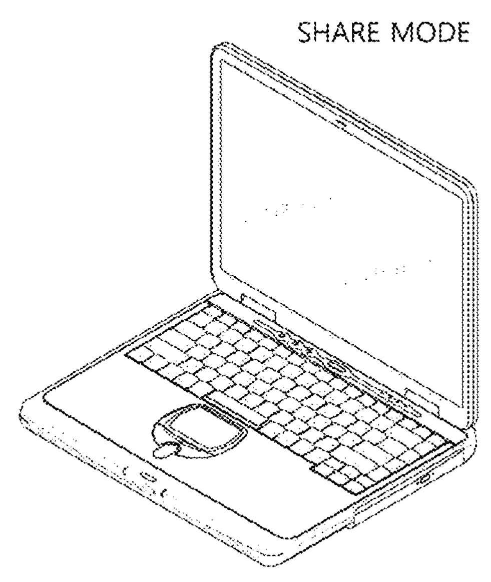
FIGS. 21 to 23 are views for explaining an embodiment of a display device to which an optical path control member according to an embodiment is applied.
Figure 22:
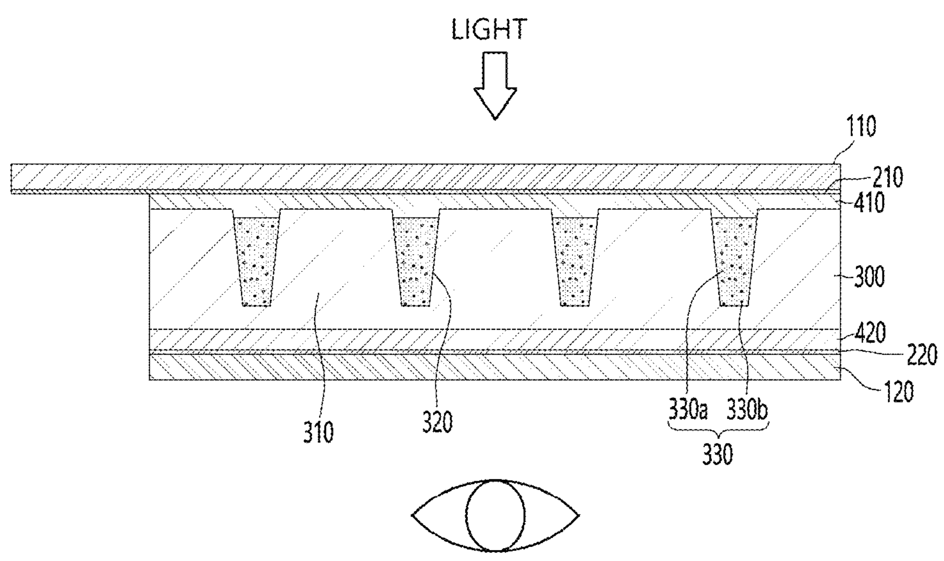
Figure 22:
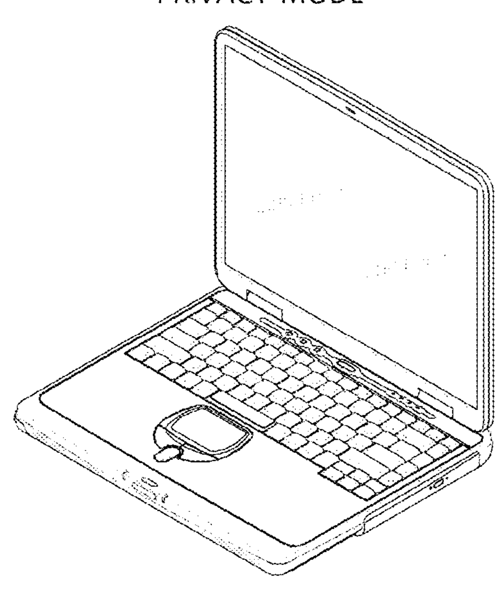
Figure 23:
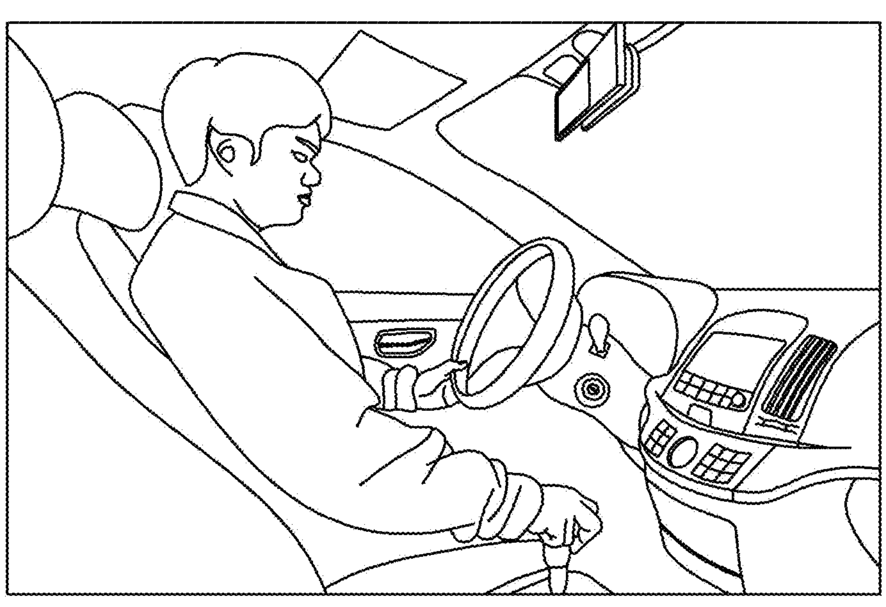

Referring to FIGS. 21 to 23, the optical path control member according to the embodiment may be applied to a display device that displays a display.

For example, when power is applied to the optical path control member as shown in FIG. 21, the receiving part functions as the light transmitting part, so that the display device may be driven in the public mode, and when power is not applied to the optical path control member as shown in FIG. 22, the receiving part functions as the light blocking part, so that the display device may be driven in the light blocking mode.

Accordingly, a user may easily drive the display device in a privacy mode or a normal mode according to application of power.

Light emitted from the backlight part or the self-luminous element may move from the first substrate toward the second substrate. Alternatively, the light emitted from the backlight part or the self-luminous element may also move from the second substrate toward the first substrate.

In addition, referring to FIG. 23, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

Further, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

What is claimed is:

1. An optical path control member comprising:

a first substrate;

a first electrode disposed on the first substrate;

a second substrate disposed on the first substrate;

a second electrode disposed under the second substrate; and a light conversion part disposed between the first electrode and the second electrode and including a receiving part in which a light conversion material is disposed, wherein at least one of the first electrode and the second electrode includes a plurality of pattern electrodes, wherein the pattern electrodes extend in a direction different from a longitudinal direction of the receiving part, wherein the pattern electrodes are disposed to be spaced apart from each other between a first end and a second end of the receiving part in the longitudinal direction, wherein the pattern electrode includes a first pattern electrode disposed adjacent to the first end and a second pattern electrode disposed farther from the first end than is the first pattern electrode, and wherein voltages having different polarities are applied to the first pattern electrode and the second pattern electrode.

2. The optical path control member of claim 1, wherein the light conversion material includes light conversion particles with negative charge, wherein a negative voltage is applied to the first pattern electrode, and wherein a positive voltage is applied to the second pattern electrode.

3. The optical path control member of claim 1, wherein the light conversion material includes light conversion particles with negative charge and a dispersion liquid for dispersing the light conversion particles, wherein the optical path control member is driven in a share mode or a privacy mode according to a movement of the light conversion particles, and wherein a positive voltage is applied to one of the first electrode or the second electrode in the share mode.

4. The optical path control member of claim 3, wherein a negative voltage is applied to the first pattern electrode in the privacy mode, and wherein a positive voltage is applied to the second pattern electrode.

5. The optical path control member of claim 4, wherein the first electrode and the second electrode include a plurality of pattern electrodes spaced apart from each other, wherein the first electrode includes a first-first pattern electrode disposed adjacent to the first end and a first-second pattern electrode disposed farther from the first end than is the first-first pattern electrode, and wherein the second electrode includes a second-first pattern electrode disposed adjacent to the first end and a second-second pattern electrode disposed farther from the first end than is the second-first pattern electrode.

6. The optical path control member of claim 5, wherein the first-first pattern electrode and the second-first pattern electrode are disposed to face each other, wherein the first-second pattern electrode and the second-second pattern electrode are disposed to face each other, wherein a negative voltage is applied to the first-first pattern electrode, and wherein a positive voltage is applied to the second-second pattern electrode.

7. The optical path control member of claim 5, wherein the second-first pattern electrode is disposed between the first-first pattern electrode and the first-second pattern electrode, wherein a negative voltage is applied to the first-first pattern electrode, and wherein a positive voltage is applied to the second-first pattern electrode.

8. The optical path control member of claim 5, wherein a negative voltage is applied to the first-first pattern electrode, and wherein a positive voltage is applied to the first-second pattern electrode.

9. The optical path control member of claim 1, wherein the first substrate or the second substrate includes at least one hole exposing the pattern electrode.

10. The optical path control member of claim 1, wherein at least one of the plurality of pattern electrodes includes a bent portion.

11. The optical path control member of claim 1, wherein the first end is an end in a gravity direction.

12. The optical path control member of claim 1, wherein each of the first pattern electrode and the second pattern electrode extends in a first direction, wherein the first pattern electrode and the second pattern electrode are spaced apart from each other in a second direction perpendicular to the first direction, and wherein a longitudinal direction of the receiving part is a diagonal direction between the first direction and the second direction.

13. The optical path control member of claim 12, wherein the pattern electrode includes a third pattern electrode disposed farther from the first end than is the second pattern electrode, wherein the second pattern electrode is disposed between the first pattern electrode and the third pattern electrode, and wherein an interval between the first pattern electrode and the second pattern electrode in the second direction is same as an interval between the second pattern electrode and the third pattern electrode in the second direction.

14. The optical path control member of claim 12, wherein the pattern electrode includes a third pattern electrode disposed farther from the first end than is the second pattern electrode, wherein the second pattern electrode is disposed between the first pattern electrode and the third pattern electrode, and wherein an interval between the first pattern electrode and the second pattern electrode in the second direction is different from an interval between the second pattern electrode and the third pattern electrode in the second direction.

15. The optical path control member of claim 14, wherein the interval between the first pattern electrode and the second pattern electrode in the second direction is smaller than the interval between the second pattern electrode and the third pattern electrode in the second direction.

16. The optical path control member of claim 15, wherein the intervals between the pattern electrodes increases in proportion to a separation distance from the first end.

17. The optical path control member of claim 14, wherein an interval between the first pattern electrode and the second pattern electrode in the second direction is greater than an interval between the second pattern electrode and the third pattern electrode in the second direction.

18. The optical path control member of claim 17, wherein the interval between the pattern electrodes decreases in inverse proportion to a separation distance from the first end.

19. The optical path control member of claim 1, comprising:

a gate array connected to the first pattern electrode and the second pattern electrode.

20. A display device comprising:

a panel comprising at least one of a display panel or a touch panel; and an optical path control member disposed on or under the panel, wherein the optical path control member includes:

a first substrate;

a first electrode disposed on the first substrate;

a second substrate disposed on the first substrate;

a second electrode disposed under the second substrate; and a light conversion part disposed between the first electrode and the second electrode and including a receiving part in which a light conversion material is disposed, wherein at least one of the first electrode and the second electrode includes a plurality of pattern electrodes, wherein the pattern electrodes extend in a direction different from a longitudinal direction of the receiving part, wherein the pattern electrodes are disposed to be spaced apart from each other between a first end and a second end of the receiving part in the longitudinal direction, wherein the pattern electrode includes a first pattern electrode disposed adjacent to the first end and a second pattern electrode disposed farther from the first end than is the first pattern electrode, and wherein voltages having different polarities are applied to the first pattern electrode and the second pattern electrode.

* * * * *